(12) United States Patent
Tahara et al.

(10) Patent No.: US 11,108,032 B2
(45) Date of Patent: Aug. 31, 2021

(54) METHOD AND APPARATUS FOR MANUFACTURING SECONDARY BATTERY

(71) Applicant: Murata Manufacturing Co., Ltd., Nagaokakyo (JP)

(72) Inventors: Retsu Tahara, Nagaokakyo (JP); Toru Kawai, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 63 days.

(21) Appl. No.: 16/524,370

(22) Filed: Jul. 29, 2019

(65) Prior Publication Data

US 2019/0355962 A1 Nov. 21, 2019

Related U.S. Application Data

(63) Continuation of application No. PCT/JP2018/005988, filed on Feb. 20, 2018.

(30) Foreign Application Priority Data

Mar. 29, 2017 (JP) .............................. JP2017-065979

(51) Int. Cl.
*H01M 4/04* (2006.01)
*B05C 5/02* (2006.01)
*B05C 9/06* (2006.01)
*H01M 4/139* (2010.01)

(52) U.S. Cl.
CPC ............. *H01M 4/0404* (2013.01); *B05C 5/02* (2013.01); *B05C 9/06* (2013.01); *H01M 4/139* (2013.01)

(58) Field of Classification Search
CPC .... H01M 4/0404; B05C 5/027; B05C 5/0279; B05C 5/0254; B05D 1/265; B05D 1/34; B05D 1/36
See application file for complete search history.

(56) References Cited

U.S. PATENT DOCUMENTS

| | | | |
|---|---|---|---|
| 2019/0103598 A1* | 4/2019 | Otohata | H01M 4/139 |
| 2020/0044230 A1* | 2/2020 | Son | B21D 28/02 |
| 2020/0295345 A1* | 9/2020 | Hirai | H01M 4/139 |

FOREIGN PATENT DOCUMENTS

| | | | |
|---|---|---|---|
| JP | H1092418 A | 4/1998 | |
| JP | 2001110408 A | 4/2001 | |
| JP | 2002028554 A | 1/2002 | |
| JP | 2011041892 A | 3/2011 | |
| JP | 2013107053 A | 6/2013 | |
| JP | 2014179217 A | 9/2014 | |
| JP | 2016001575 A | 1/2016 | |

OTHER PUBLICATIONS

International Search Report issued in PCT/JP2018/005988, dated Apr. 10, 2018.
Written Opinion of the International Searching Authority issued in PCT/JP2018/005988, dated Apr. 10, 2018.

* cited by examiner

*Primary Examiner* — Austin Murata
(74) *Attorney, Agent, or Firm* — Arent Fox LLP

(57) ABSTRACT

A method for manufacturing a secondary battery by performing two or more kinds of intermittent coating in combination using two or more die heads so as to apply an electrode material layer-forming raw material to a metal sheet material to obtain an electrode precursor; and cutting the electrode precursor to form a plurality of electrodes.

14 Claims, 16 Drawing Sheets

FIG. 18A - PRIOR ART
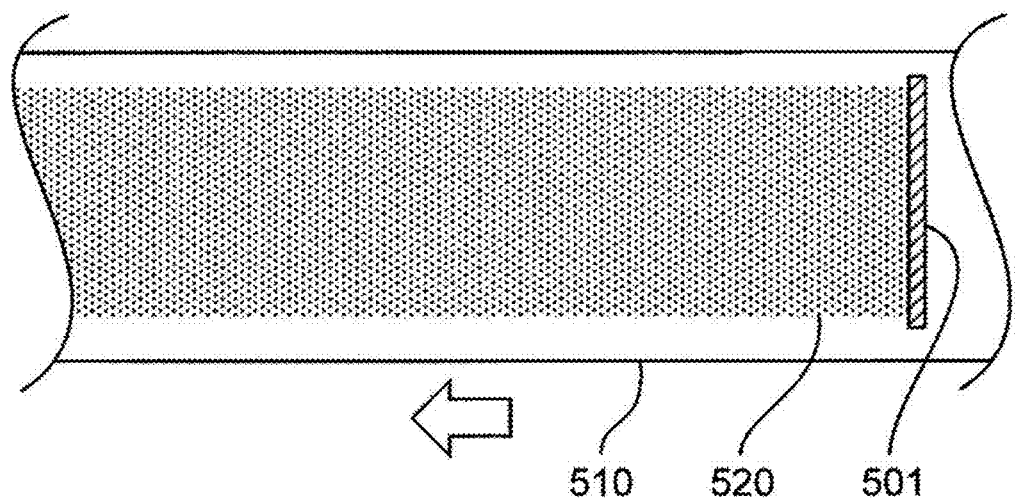
FIG. 18B - PRIOR ART
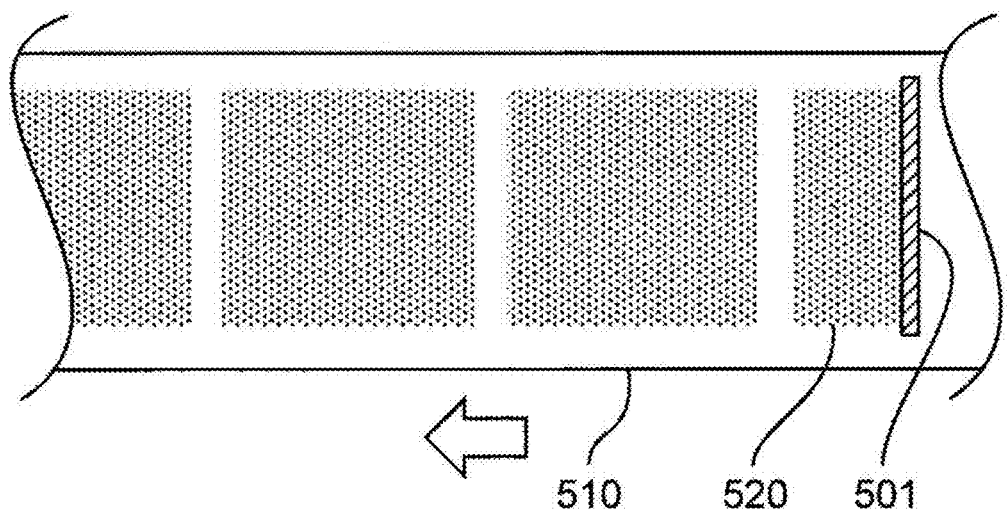

FIG. 18C - PRIOR ART
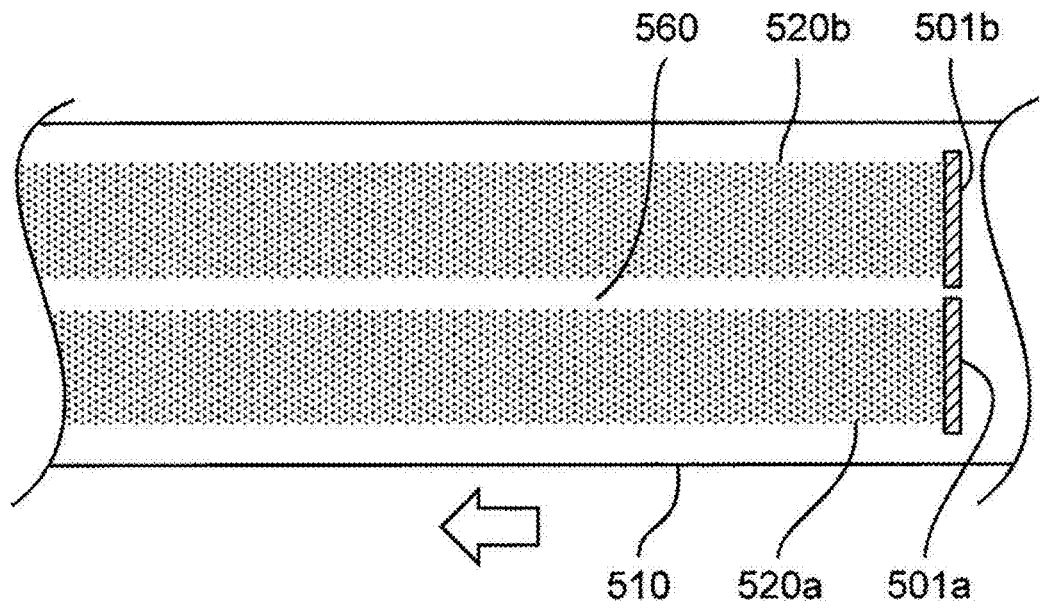
FIG. 18D - PRIOR ART
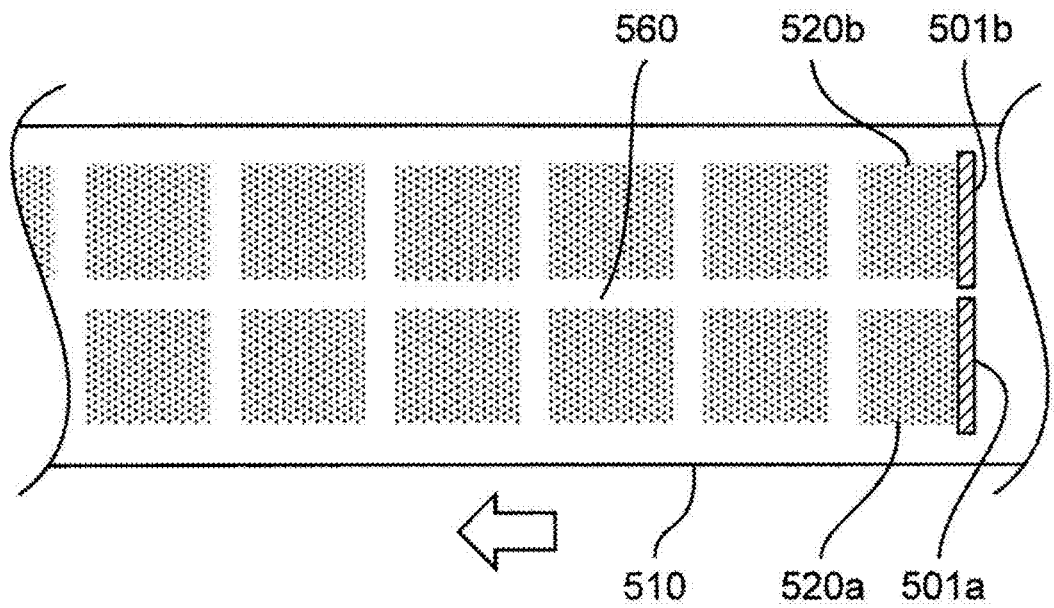

FIG. 19A – PRIOR ART
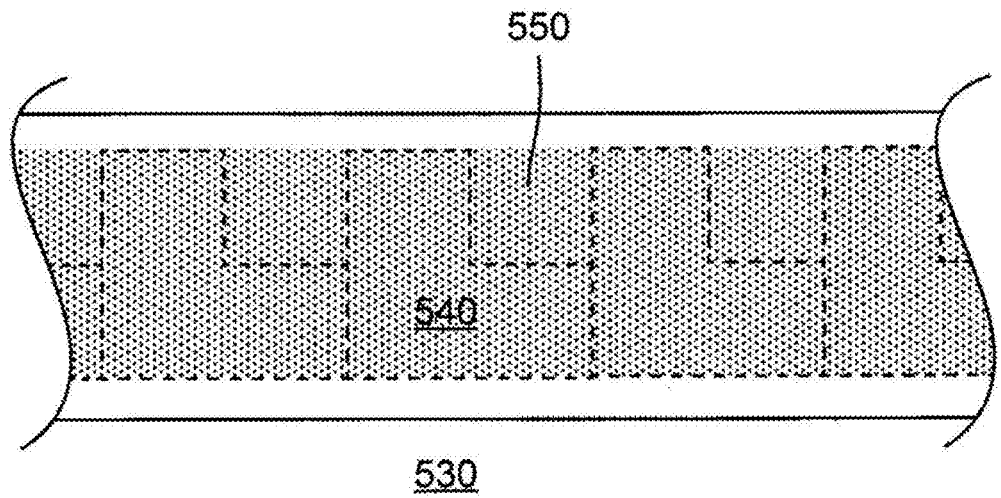
FIG. 19B – PRIOR ART
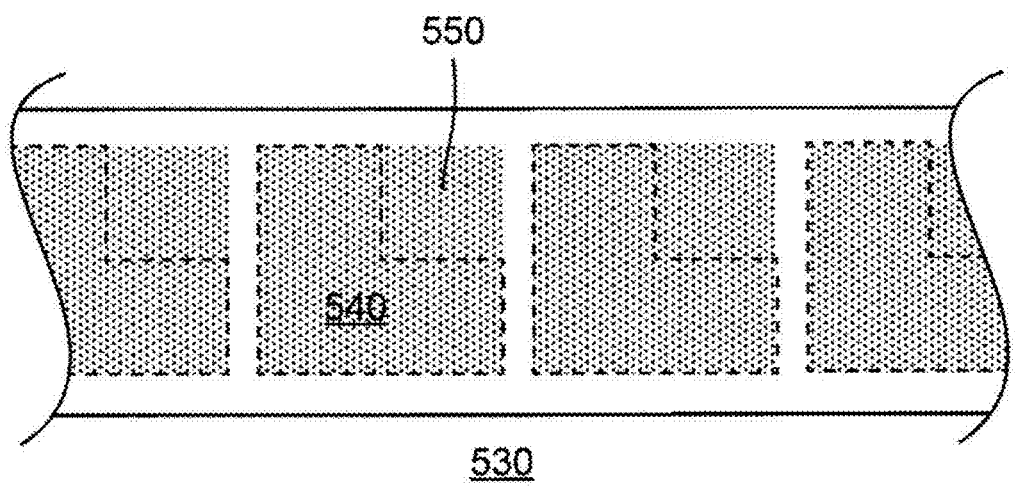

FIG. 19C — PRIOR ART
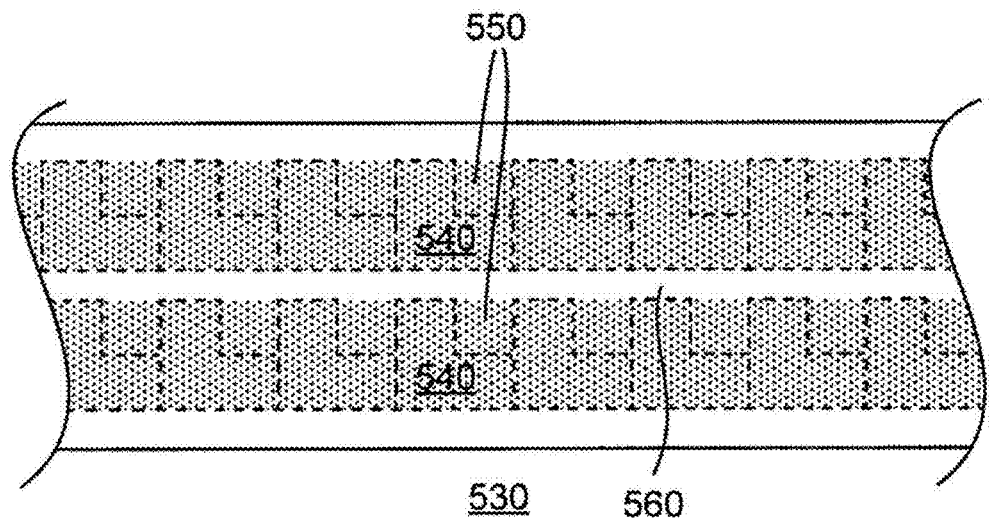
FIG. 19D — PRIOR ART
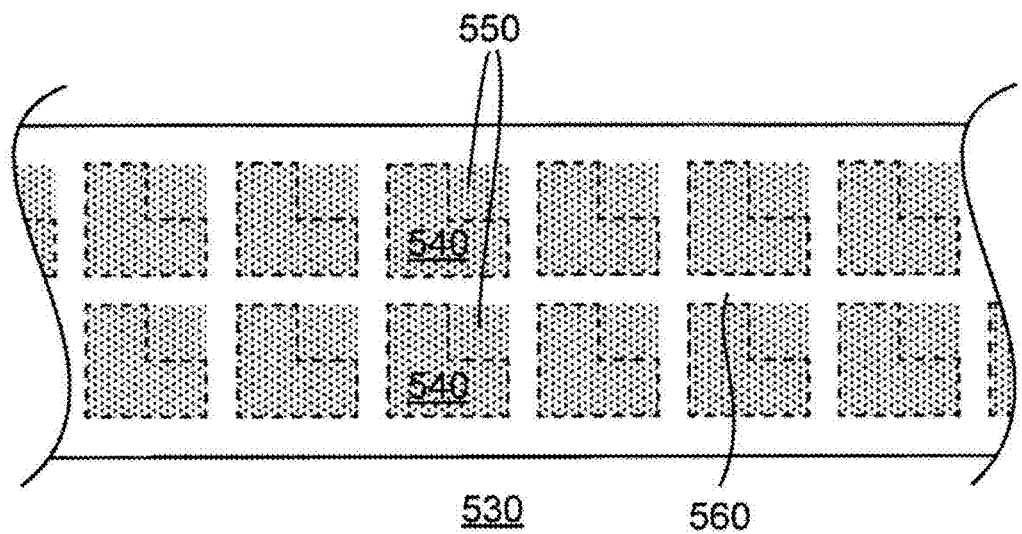

METHOD AND APPARATUS FOR MANUFACTURING SECONDARY BATTERY

CROSS REFERENCE TO RELATED APPLICATIONS

The present application is a continuation of International application No. PCT/JP2018/005988, filed Feb. 20, 2018, which claims priority to Japanese Patent Application No. 2017-065979, filed Mar. 29, 2017, the entire contents of each of which are incorporated herein by reference.

FIELD OF THE INVENTION

The present invention relates to a method and an apparatus for manufacturing a secondary battery. In particular, the present invention relates to a method and an apparatus for manufacturing a secondary battery, and in particular, the fabrication of at least either of a positive electrode or a negative electrode.

BACKGROUND OF THE INVENTION

Secondary batteries can be repeatedly charged and discharged because of being so-called "storage batteries" and are used in various applications. For example, secondary batteries are used in mobile devices such as mobile phones, smartphones and laptop computers.

Secondary batteries are composed of at least a positive electrode, a negative electrode, and a separator interposed therebetween. The positive electrode is composed of a positive electrode material layer and a positive electrode current collector, and the negative electrode is composed of a negative electrode material layer and a negative electrode current collector.

In fabrication of each of the positive electrode and the negative electrode, the electrode material layer-forming raw materials are applied from a die head onto a metal sheet material to form an electrode current collector, an electrode material layer is then formed thereon, and an electrode precursor is thus obtained. Then, the electrode precursor is cut, and a plurality of electrodes are thus obtained.

From the viewpoint of mass production of electrodes, the following method is known as a method for applying electrode material layer-forming raw materials: (1) as illustrated in FIG. 18A, a method in which an electrode material layer-forming raw material 520 is continuously applied onto a moving metal sheet material 510 from one die head 501; and (2) as illustrated in FIG. 18B, a method in which an electrode material layer-forming raw material 520 is intermittently applied onto a moving metal sheet material 510 from one die head 501.

From the viewpoint of further mass production of electrodes, methods in which two or more die heads are used are also known as described below: (3) as illustrated in FIG. 18C, a method in which electrode material layer-forming raw materials 520a and 520b are continuously applied onto a moving metal sheet material 510 from respective two or more die heads 501a and 501b in the same coating shape (Patent Document 1); and (4) as illustrated in FIG. 18D, a method in which electrode material layer-forming raw materials 520a and 520b are intermittently applied onto a moving metal sheet material 510 from respective two or more die heads 501a and 501b in the same coating shape and at the same coating pitch.

FIGS. 18A to 18D are each a plan view which schematically illustrates an embodiment of a step of applying an electrode material layer-forming raw material in the prior art.

Patent Document 1: Japanese Patent Application Laid-Open No. 2011-41892

SUMMARY OF THE INVENTION

The inventors of the present application have noticed that there is a problem to be overcome in the conventional method for manufacturing a secondary battery and found out the necessity of taking measures to address the same. Specifically, the inventors of the present application have found out that there are the following problems when fabricating an electrode having a non-rectangular shape different from a rectangular shape.

In any of the above methods, a rectangular shape is continuously or intermittently obtained as a coating shape of the electrode material layer-forming raw material. In addition, in the methods (3) and (4), the coating shapes of the electrode material layer-forming raw material from two or more die heads are separated by a slit 560 for each die head as illustrated in FIG. 18C and FIG. 18D. For this reason, when cutting a plurality of non-rectangular electrodes 540 as illustrated in, for example, FIGS. 19A to 19D from an electrode precursor 530, the residual portion (in particular, the residual portion of electrode material layer material) 550 to be discarded after cutting have been relatively great. As a result, these methods have never been said to have high manufacturing efficiency. FIGS. 19A to 19D are each a plan view which schematically illustrates an embodiment of a step of cutting an electrode using the electrode precursor obtained in FIGS. 18A to 18D.

The present invention has been made in view of such problems, and a main object thereof is to provide a method and an apparatus for manufacturing a secondary battery with higher manufacturing efficiency.

The inventors of the present application have attempted to solve the problems by dealing with the above problems in a new direction instead of dealing with the problems in the extension of the prior art. As a result, the invention of a method and an apparatus for manufacturing a secondary battery by which the main object has been accomplished has been achieved.

The present invention relates to a method for manufacturing a secondary battery by performing two or more kinds of intermittent coating in combination using two or more die heads so as to apply an electrode material layer-forming raw material to a metal sheet material to obtain an electrode precursor; and cutting the electrode precursor to form a plurality of electrodes.

The present invention also relates to an apparatus for manufacturing a secondary battery which includes two or more die heads for performing two or more kinds of intermittent coating that apply an electrode material layer-forming raw material to a metal sheet material for fabrication of a plurality of electrodes of at least either of a positive electrode or a negative electrode.

By the method and apparatus for manufacturing a secondary battery according to the present invention, the manufacturing efficiency can be further enhanced. More specifically, the "residual portion after cutting" can be diminished when cutting a plurality of electrodes from an electrode precursor.

BRIEF EXPLANATION OF THE DRAWINGS

FIG. 18A is a plan view which schematically illustrates an embodiment of a step of applying an electrode material layer-forming raw material in the prior art.

FIG. 18B is a plan view which schematically illustrates an embodiment of a step of applying an electrode material layer-forming raw material in the prior art.

FIG. 18C is a plan view which schematically illustrates an embodiment of a step of applying an electrode material layer-forming raw material in the prior art.

FIG. 18D is a plan view which schematically illustrates an embodiment of a step of applying an electrode material layer-forming raw material in the prior art.

FIG. 19A is a plan view which schematically illustrates an embodiment of a step of cutting an electrode using the electrode precursor obtained in FIG. 18A.

FIG. 19B is a plan view which schematically illustrates an embodiment of a step of cutting an electrode using the electrode precursor obtained in FIG. 18B.

FIG. 19C is a plan view which schematically illustrates an embodiment of a step of cutting an electrode using the electrode precursor obtained in FIG. 18C.

FIG. 19D is a plan view which schematically illustrates an embodiment of a step of cutting an electrode using the electrode precursor obtained in FIG. 18D.

DETAILED DESCRIPTION OF THE INVENTION

Figure 1:
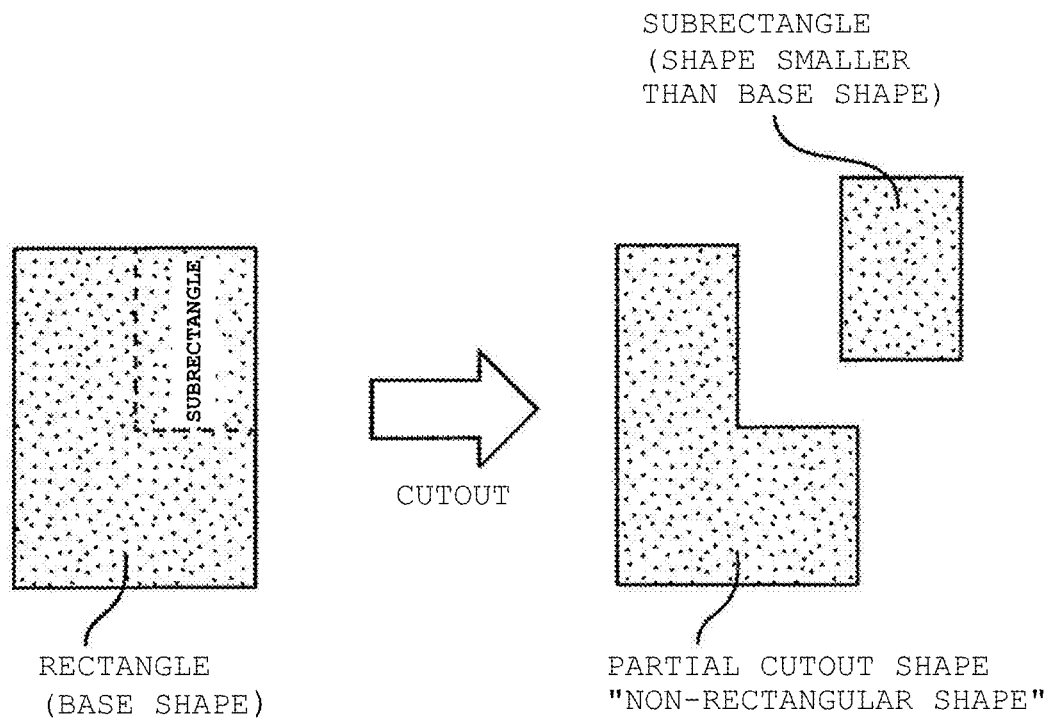
FIG. 1 is a schematic diagram for explaining a "non-rectangular shape" ("partial cutout shape").

Hereinafter, a method for manufacturing a secondary battery according to an embodiment of the present invention is described in more detail. Although the description is given with reference to the drawings if necessary, various elements in the drawings are merely schematically and exemplarily illustrated for the understanding of the present invention, and the appearance, dimension ratios and the like may be different from those of the real thing.

The direction of "thickness" described directly or indirectly in the present specification is based on the stacking direction of the electrode materials constituting the secondary battery, that is, the "thickness" corresponds to the dimension in the stacking direction of the positive electrode and the negative electrode.

In addition, the "vertical direction" and the "horizontal direction" used directly or indirectly in the present specification correspond to the vertical direction and the horizontal direction in the drawings, respectively. Unless otherwise stated, the same reference signs or symbols indicate the same members or the same meaning except for the difference in shape.

[Configuration of Secondary Battery Manufactured in Present Invention]

A secondary battery is obtained by the manufacturing method of the present invention. The term "secondary battery" as used herein refers to a battery which can be repeatedly charged and discharged. Hence, a secondary battery obtained by the manufacturing method of the present invention does not excessively adhere to the name and may include, for example, a "storage device" as the target.

A secondary battery obtained by the manufacturing method of the present invention includes an electrode assembly in which an electrode configuration layer including a positive electrode, a negative electrode, and a separator is stacked. The positive electrode and the negative electrode are stacked with the separator interposed therebetween to form an electrode configuration layer, and an electrode assembly in which at least one or more electrode configuration layers are stacked is enclosed in an outer packaging body together with an electrolyte.

The positive electrode includes at least a positive electrode material layer and a positive electrode current collector. In the positive electrode, a positive electrode material layer is provided on at least one side of a positive electrode current collector, and the positive electrode material layer contains a positive electrode active material as an electrode active material. For example, in the plurality of positive electrodes in the electrode assembly, the positive electrode material layer may each be provided on both sides of the positive electrode current collector or the positive electrode material layer may be provided only on one side of the positive electrode current collector. From the viewpoint of further increasing the capacitance of the secondary battery, it is preferable that the positive electrode material layer is provided on both sides of the positive electrode current collector in the positive electrode.

The negative electrode includes at least a negative electrode material layer and a negative electrode current collector. In the negative electrode, a negative electrode material layer is provided on at least one side of a negative electrode current collector, and the negative electrode material layer contains a negative electrode active material as an electrode active material. For example, in the plurality of negative electrodes in the electrode assembly, the negative electrode material layer may each be provided on both sides of the negative electrode current collector or the negative electrode material layer may be provided only on one side of the negative electrode current collector. From the viewpoint of further increasing the capacitance of the secondary battery, it is preferable that the negative electrode material layer is provided on both sides of the negative electrode current collector in the negative electrode.

The electrode active materials contained in the positive electrode and the negative electrode, namely, the positive electrode active material and the negative electrode active material are materials which are directly involved in the delivery of electrons in the secondary battery and are main materials of the positive and negative electrodes responsible for charge and discharge, namely, the cell reaction. More specifically, ions are generated in the electrolyte from the "positive electrode active material contained in the positive electrode material layer" and the "negative electrode active material contained in the negative electrode material layer", the ions migrate between the positive electrode and the negative electrode to deliver the electrons, and charge and discharge are thus performed. It is particularly preferable that the positive electrode material layer and the negative electrode material layer are layers which can store and release lithium ions. In other words, it is preferable that the secondary battery is a non-aqueous electrolyte secondary battery in which lithium ions migrate between the positive electrode and the negative electrode via the non-aqueous electrolyte and charge and discharge of the battery are thus performed. In a case in which lithium ions are involved in charge and discharge, the secondary battery obtained by the manufacturing method of the present invention corresponds to a so-called "lithium ion battery," and the positive electrode and the negative electrode have layers which can store and release lithium ions.

The positive electrode active material of the positive electrode material layer is formed of, for example, a granular material, and it is thus preferable that a binder is contained in the positive electrode material layer for sufficient contact between the grains and for shape retention. Furthermore, an auxiliary conducting agent may be contained in the positive electrode material layer in order to facilitate the transfer of electrons which promote the cell reaction. In the same manner, the negative electrode active material of the negative electrode material layer is formed of, for example, a granular material, and thus it is preferable that a binder is contained for sufficient contact between the grains and for shape retention and an auxiliary conducting agent may be contained in the negative electrode material layer in order to facilitate the transfer of electrons which promote the cell reaction. In this manner, the positive electrode material layer and the negative electrode material layer can also be referred to as a "positive electrode mixture layer", a "negative electrode mixture layer" and the like, respectively, because of the forms thereof in which a plurality of components are contained.

It is preferable that the positive electrode active material is a material which contributes to the storage and release of lithium ions. It is preferable that the positive electrode active material is, for example, a lithium-containing composite oxide. More specifically, it is preferable that the positive electrode active material is a lithium-transition metal composite oxide containing lithium and at least one transition metal selected from the group consisting of cobalt, nickel, manganese, and iron. In other words, in the positive electrode material layer of the secondary battery obtained by the manufacturing method of the present invention, such a lithium-transition metal composite oxide is preferably contained as a positive electrode active material. For example, the positive electrode active material may be lithium cobaltate, lithium nickelate, lithium manganate, lithium iron phosphate, or those obtained by substituting a part of these transition metals therein with other metals. Such positive electrode active materials may be contained as a single kind but may be contained in combination of two or more kinds thereof. In the secondary battery obtained by the manufacturing method of the present invention, the positive electrode active material contained in the positive electrode material layer is preferably lithium cobaltate.

The binder which can be contained in the positive electrode material layer is not particularly limited, but examples thereof include at least one selected from the group consisting of polyfluorinated vinylidene, a vinylidene fluoride-hexafluoropropylene copolymer, a vinylidene fluoride-tetrafluoroethylene copolymer, and polytetrafluoroethylene. The auxiliary conducting agent which can be contained in the positive electrode material layer is not particularly limited, but examples thereof include at least one selected from carbon black such as thermal black, furnace black, channel black, ketjen black, and acetylene black, graphite, carbon fibers such as carbon nanotube and vapor grown carbon fiber, metal powders such as copper, nickel, aluminum, and silver, or polyphenylene derivatives. For example, the binder in the positive electrode material layer may be polyvinylidene fluoride, and the auxiliary conducting agent in the positive electrode material layer may be carbon black. The binder and auxiliary conducting agent in the positive electrode material layer may be a combination of polyvinylidene fluoride with carbon black although it is only an example to the last.

It is preferable that the negative electrode active material is a material which contributes to the storage and release of lithium ions. It is preferable that the negative electrode active material is, for example, various kinds of carbon materials, oxides, or lithium alloys.

Examples of various kinds of carbon materials of the negative electrode active material include graphite (natural graphite and artificial graphite), hard carbon, soft carbon, and diamond-like carbon. In particular, graphite is preferable from the viewpoint of having high electron conductivity and excellent adhesive property to the negative electrode current collector. Examples of the oxide of the negative electrode active material include at least one selected from the group consisting of silicon oxide, tin oxide, indium oxide, zinc oxide, and lithium oxide. The lithium alloy of the negative electrode active material may be binary, ternary or higher alloys of lithium with any metal which can be alloyed with lithium, for example, metals such as Al, Si, Pb, Sn, In, Bi, Ag, Ba, Ca, Hg, Pd, Pt, Te, Zn, and La. It is preferable that such oxides are amorphous as the structural form. This is because deterioration due to nonuniformity such as grain boundaries or defects is less likely to occur. In the secondary battery obtained by the manufacturing method of the present invention, the negative electrode active material of the negative electrode material layer is preferably artificial graphite.

The binder which can be contained in the negative electrode material layer is not particularly limited, but examples thereof include at least one selected from the group consisting of styrene butadiene rubber, polyacrylic acid, polyvinylidene fluoride, a polyimide-based resin, and a polyamideimide-based resin. For example, the binder contained in the negative electrode material layer may be styrene butadiene rubber. The auxiliary conducting agent which can be contained in the negative electrode material layer is not particularly limited, but examples thereof include at least one selected from carbon black such as thermal black, furnace black, channel black, ketjen black, and acetylene black, graphite, carbon fibers such as carbon nanotube and vapor grown carbon fiber, metal powders such as copper, nickel, aluminum, and silver, or polyphenylene derivatives. Incidentally, the negative electrode material layer may contain a component derived from the thickener component (for example, carboxymethylcellulose) used at the time of battery manufacture.

The negative electrode active material and the binder in the negative electrode material layer is preferably a combination of artificial graphite with styrene butadiene rubber.

The positive electrode current collector and the negative electrode current collector used in the positive electrode and the negative electrode are members contributing to collection and supply of the electrons generated in the active material by the cell reaction. Such a current collector may be a sheet-like metal member and may have a porous or perforated form. For example, the current collector may be a metal foil, a punching metal, a net, an expanded metal or the like. The positive electrode current collector used in the positive electrode is preferably formed of a metal foil containing at least one selected from the group consisting of aluminum, stainless steel, nickel and the like and may be, for example, an aluminum foil. Meanwhile, the negative electrode current collector used in the negative electrode is preferably formed of a metal foil containing at least one selected from the group consisting of copper, stainless steel, nickel and the like and may be, for example, a copper foil.

The separators used in the positive electrode and the negative electrode are members to be provided from the viewpoint of prevention of short circuit due to contact between the positive and negative electrodes and electrolyte retention. In other words, the separator is a member which allows ions to pass while preventing electronic contact between the positive electrode and the negative electrode. Preferably, the separator is a porous or microporous insulating member and has a membrane form because of the thin thickness. A microporous polyolefin membrane is preferably used as a separator. With regard to this point, the microporous membrane used as a separator may contain, for example, only polyethylene (PE) or only polypropylene (PP) as the polyolefin. Furthermore, the separator may be a laminate formed of a "PE microporous membrane" and a "PP microporous membrane". The surface of the separator may be covered with an inorganic particle coating layer, an adhesive layer or the like. The surface of the separator may exhibit adhesive property. Incidentally, in the present invention, the separator may be insulating inorganic particles having the same function.

In the secondary battery obtained by the manufacturing method of the present invention, an electrode assembly composed of an electrode configuration layer including a positive electrode, a negative electrode, and a separator is enclosed in an outer packaging body together with an electrolyte. In a case in which the positive electrode and the negative electrode have layers which can store and release lithium ions, it is preferable that the electrolyte is a "non-aqueous" electrolyte such as organic electrolyte/organic solvent (that is, the electrolyte is preferably a non-aqueous electrolyte). The metal ions released from the electrodes (positive electrode and negative electrode) are present in the electrolyte and thus the electrolyte helps the migration of metal ions in the cell reaction.

The non-aqueous electrolyte is an electrolyte containing a solvent and a solute. As a specific solvent in the non-aqueous electrolyte, one containing at least a carbonate is preferable. Such a carbonate may be cyclic carbonates and/or linear carbonates. Although it is not particularly limited, cyclic carbonates include at least one selected from the group consisting of propylene carbonate (PC), ethylene carbonate (EC), butylene carbonate (BC) and vinylene carbonate (VC). Linear carbonates include at least one selected from the group consisting of dimethyl carbonate (DMC), diethyl carbonate (DEC), ethyl methyl carbonate (EMC), and dipropyl carbonate (DPC). A combination of a cyclic carbonate with a linear carbonate may be used as the non-aqueous electrolyte and, for example, a mixture of ethylene carbonate and diethyl carbonate is used although it is only an example to the last. In addition, as a specific solute in the non-aqueous electrolyte, for example, Li salts such as $LiPF_6$ and/or $LiBF_4$ are preferably used. The electrolyte may be a liquid electrolyte, a solid electrolyte, a gel electrolyte or the like.

The outer packaging body encloses an electrode assembly in which an electrode configuration layer including a positive electrode, a negative electrode, and a separator is stacked but may be in the form of a hard case or in the form of a soft case. Specifically, the outer packaging body may be a hard case type corresponding to a so-called "metal can" or may be a soft case type corresponding to a "pouch" formed of a so-called laminate film.

[Features of Manufacturing Method of Present Invention]

Figure 12A:
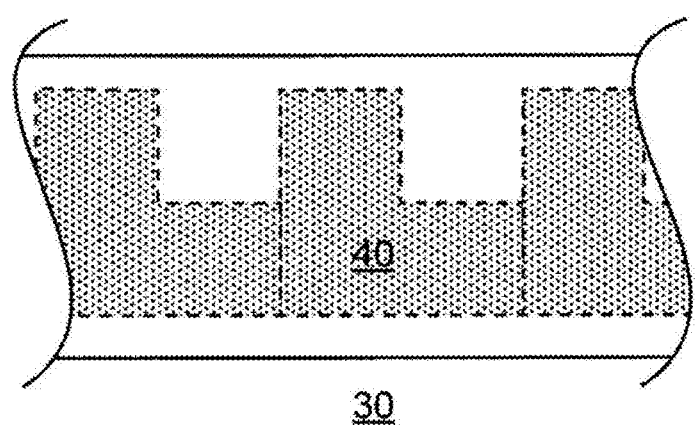
FIG. 12A is a plan view which schematically illustrates an embodiment of a step of cutting an electrode using the electrode precursor obtained in FIG. 2.
Figure 12B:
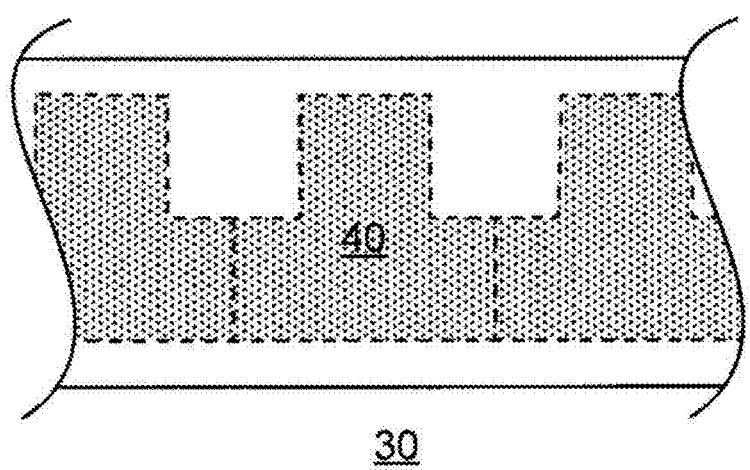
FIG. 12B is a plan view which schematically illustrates an embodiment of a step of cutting an electrode using the electrode precursor obtained in FIG. 2.
Figure 13A:
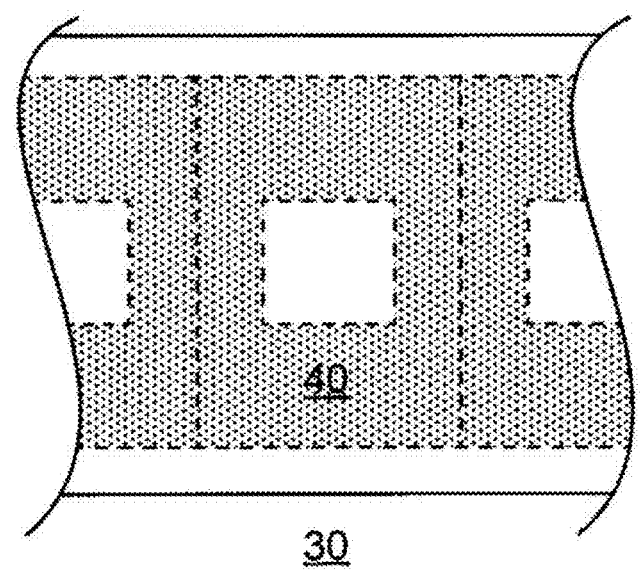
FIG. 13A is a plan view which schematically illustrates an embodiment of a step of cutting an electrode using the electrode precursor obtained in FIG. 4.
Figure 13B:
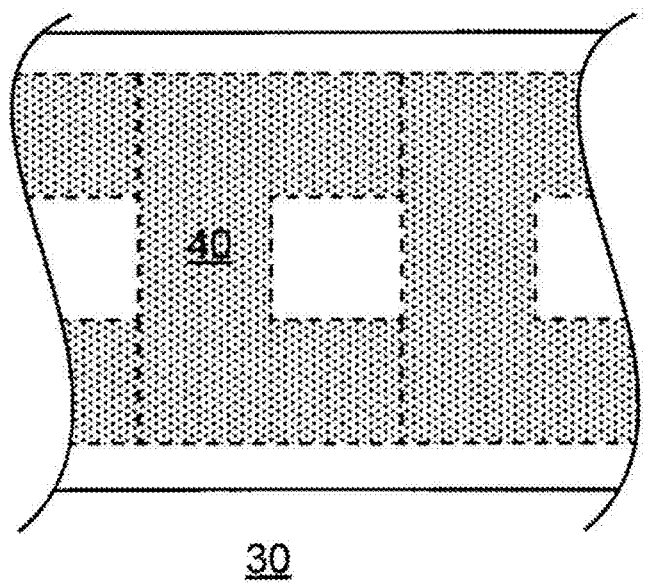
FIG. 13B is a plan view which schematically illustrates an embodiment of a step of cutting an electrode using the electrode precursor obtained in FIG. 4.
Figure 13C:
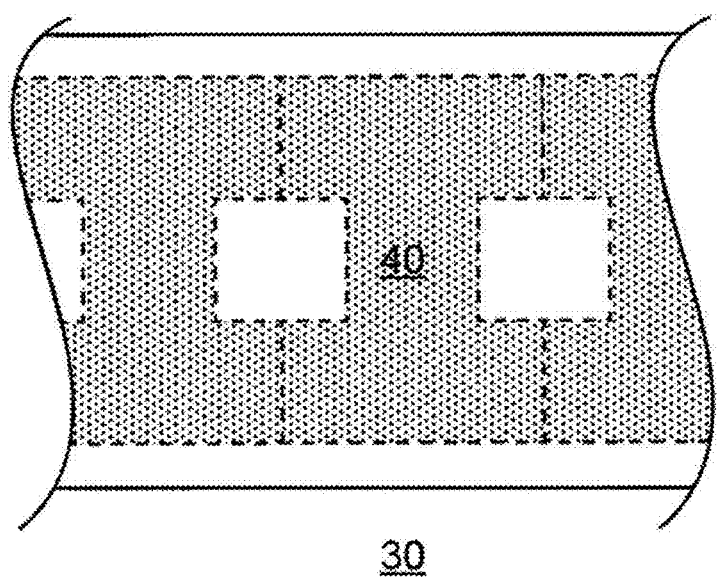
FIG. 13C is a plan view which schematically illustrates an embodiment of a step of cutting an electrode using the electrode precursor obtained in FIG. 4.
Figure 14:
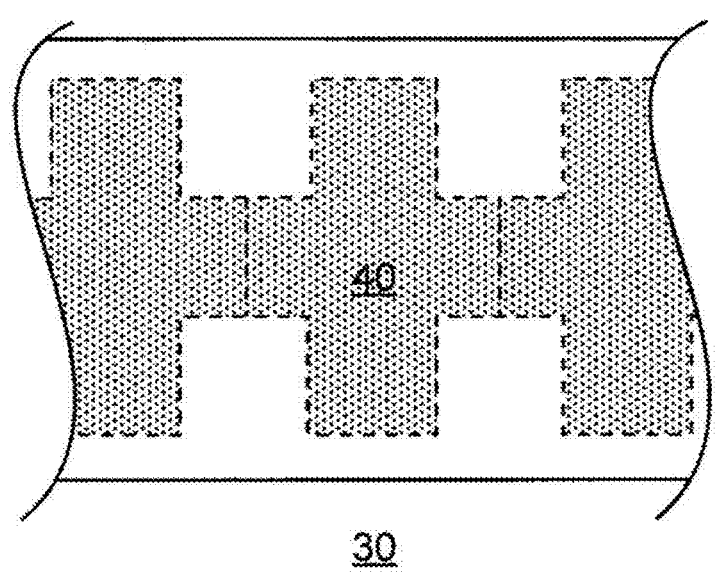
FIG. 14 is a plan view which schematically illustrates an embodiment of a step of cutting an electrode using the electrode precursor obtained in FIG. 6.
Figure 15:
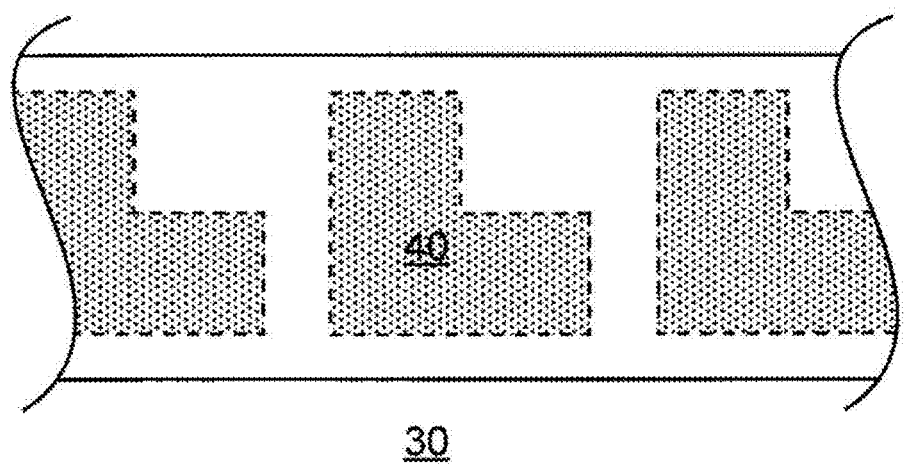
FIG. 15 is a plan view which schematically illustrates an embodiment of a step of cutting an electrode using the electrode precursor obtained in FIG. 8.
Figure 16:
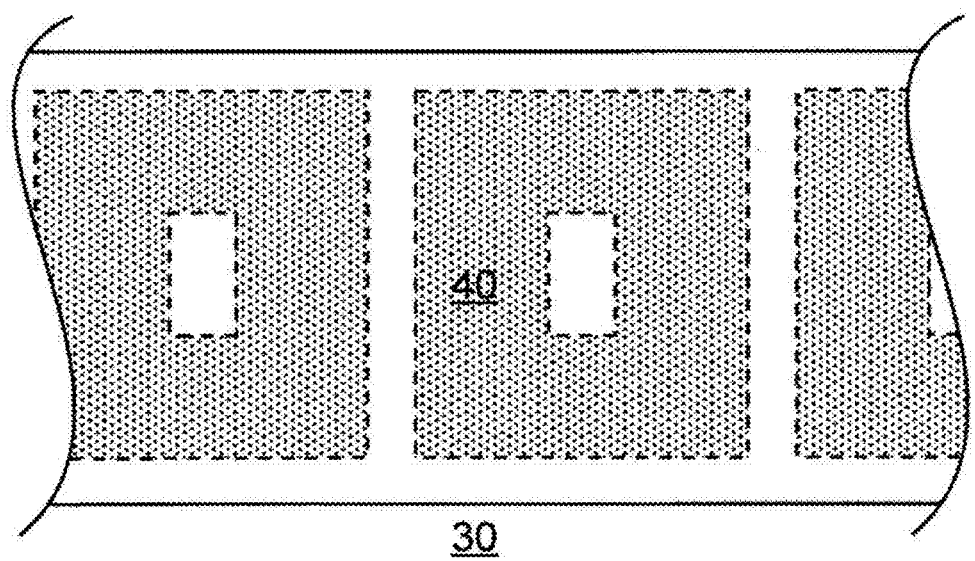
FIG. 16 is a plan view which schematically illustrates an embodiment of a step of cutting an electrode using the electrode precursor obtained in FIG. 10.

The manufacturing method of the present invention has features in the method for fabricating an electrode. In particular, the present invention has features in the coating of the electrode current collector with the electrode material layer-forming raw material at the time of fabrication of at least either of the positive electrode or the negative electrode. Specifically, in the manufacturing method of the present invention, fabrication of at least either of the positive electrode or the negative electrode includes applying an electrode material layer-forming raw material 10 from the die head to a metal sheet material to be the electrode current collector to form an electrode material layer 20 and obtaining an electrode precursor 30 as illustrated in FIG. 2, FIG. 4, FIG. 6, FIG. 8, and FIG. 10; and cutting the electrode precursor 30 to form a plurality of electrodes 40 as illustrated in FIG. 12A, FIG. 12B, FIG. 13A, FIG. 13B, FIG. 13C, and FIG. 14 to FIG. 16. More specifically, in the step of applying an electrode material layer-forming raw material, two or more kinds of intermittent coating are performed in combination using two or more die heads. In the step of cutting an electrode, usually the cutting shape of each of the plurality of electrodes 40 is set to a non-rectangular shape. FIG. 2, FIG. 4, FIG. 6, FIG. 8, and FIG. 10 are each a plan view which schematically illustrates an embodiment of an electrode precursor obtained in the step of applying an electrode material layer-forming raw material in the method for manufacturing a secondary battery of the present invention. FIG. 12A and FIG. 12B are each a plan view which schematically illustrates an embodiment of a step of cutting an electrode using the electrode precursor obtained in FIG. 2. FIG. 13A, FIG. 13B, and FIG. 13C are each a plan view which schematically illustrates an embodiment of a step of cutting an electrode using the electrode precursor obtained in FIG. 4. FIG. 14 is a plan view which schematically illustrates an embodiment of a step of cutting an electrode using the electrode precursor obtained in FIG. 6. FIG. 15 is a plan view which schematically illustrates an embodiment of a step of cutting an electrode using the electrode precursor obtained in FIG. 8. FIG. 16 is a plan view which schematically illustrates an embodiment of a step of cutting an electrode using the electrode precursor obtained in FIG. 10.

The term "non-rectangular shape" as used herein refers to an electrode shape in plan view which is not normally included in the concept of rectangular shape such as a square and an oblong and particularly refers to a shape which is partially lacking from such a square/an oblong. Hence, the term "non-rectangular shape" in a broad sense refers to an electrode shape in plan view when viewed from the upper side in the thickness direction which is a shape other than a square/an oblong and in a narrow sense refers to an electrode shape in plan view which is based on a square/an oblong but partially lacking therefrom (preferably, a shape obtained by cutting off the corner portion and/or non-corner portion (for example, central portion) of the base square/oblong). The term "non-rectangular shape" may refer to an electrode shape in plan view which is based on a square/an oblong and obtained by cutting off a part of a square, an oblong, a semicircle, a semi-ellipse, or a circle/an ellipse having a smaller size in plan view than the base shape or a combination shape thereof from the base shape (in particular, a shape obtained by cutting off the corner portion or a non-corner portion (for example, the central portion) of the base shape) (see FIG. 1). The plan view refers to a state in which an object (for example, an electrode, an electrode precursor) is placed and viewed from directly above in the thickness (height) direction and has the same meaning as the plan view. FIG. 1 is a schematic diagram for explaining a "non-rectangular shape" ("partial cutout shape"). Incidentally, in FIG. 1, a shape obtained by cutting off the corner portion of a base shape is illustrated but the non-rectangular shape may be a shape obtained by cutting off the non-corner portion (for example, the central portion) of the base shape.

In the present invention, two or more kinds of intermittent coating are performed in combination using two or more die heads so that a plurality of electrodes having such a "non-rectangular shape" are efficiently obtained. This expands the range of the entire coating shape which can be formed by the electrode material layer-forming raw material on the metal sheet material 10. For this reason, it is possible to obtain the entire coating shape of the electrode material layer-forming raw material by which the residual portion after cutting can be diminished according to the cutting shape (non-rectangular shape) of the plurality of electrodes planned. This means that the "waste portion" which is not finally used in the manufacture of secondary battery can be decreased (in particular, the disposal of the electrode active material can be decreased), and the manufacturing efficiency of secondary battery further increases. In addition, to be able to decrease the "waste portion" in this manner leads to the manufacture of secondary battery at low cost.

First, a general method for manufacturing a secondary battery, which is a premise of the manufacturing method of the present invention is described. In the method for manufacturing a secondary battery, a secondary battery can be obtained by respectively fabricating/preparing a positive electrode, a negative electrode, an electrolytic solution, and a separator (may be procured from commercially available products if necessary) and then integrating and combining these together.

(Fabrication of Positive Electrode)

In the fabrication of positive electrode, first, a positive electrode material layer-forming raw material, namely, an electrode material layer-forming raw material is prepared. The positive electrode material layer-forming raw material may be a positive electrode material slurry. The positive electrode material slurry is an electrode material layer-forming raw material containing at least a positive electrode active material and a binder. The positive electrode material slurry is applied (coating step) to a metal sheet material (for example, an aluminum foil) to be used as a positive electrode current collector and rolled using a roll press. By this, a positive electrode precursor, namely, an electrode precursor is obtained. In particular, the metal sheet material preferably has a strip-like long shape, and the positive electrode material slurry is applied to such a long metal sheet. It is preferable that the area to be coated is not the entire region of the long metal sheet but is a specific area to be described later so that both peripheral portions in the width direction of the metal sheet material are not coated. In a preferred aspect, it is preferable to apply the positive electrode material slurry to the same substantially long specific area to be described later so that the coated area is smaller than the long metal sheet material by one size. The positive electrode precursor (in particular, a strip-like long positive electrode precursor) to be obtained is preserved by being wound in a roll shape or the like if necessary until to be subjected to the next step or appropriately subjected to transportation and the like. Moreover, in the next step, cutting (cutting step) is performed to obtain a plurality of positive electrodes from the positive electrode precursor (the cutting is performed after the positive electrode precursor is unrolled in the case of being wound in a roll shape). For example, cutting out of the positive electrode from the positive electrode precursor (in particular, "the portion coated with the positive electrode material slurry") is performed by subjecting the positive electrode precursor to mechanical cutting. So-called "punching operation" may be performed although it is only an example to the last. After the pressing step and before the cutting step, usually a slitting step of cutting off both end portions (uncoated portions) in the width direction of the electrode precursor containing the metal sheet material and the electrode material layer formed on the metal sheet material may be performed. In the slitting step, the uncoated region to be a tab or an uncoated region larger than the tab may be left if desired. In the slitting step, the coated portions may be cut apart from each other (for example, cut along m in FIG. 6). The slitting step may be performed between the coating step and the pressing step. A plurality of desired positive electrodes can be obtained through the operation as described above.

(Fabrication of Negative Electrode)

The fabrication of the negative electrode is the same as the fabrication of the positive electrode. In the fabrication of negative electrode, first, a negative electrode material layer-forming raw material, namely, an electrode material layer-forming raw material is prepared. The negative electrode material layer-forming raw material may be a negative electrode material slurry. The negative electrode material slurry is an electrode material layer-forming raw material containing at least a negative electrode active material and a binder. The negative electrode material slurry is applied (coating step) to a metal sheet material (for example, a copper foil) to be used as a negative electrode current collector and rolled (pressing step) using a roll press. By this, a negative electrode precursor, namely, an electrode precursor is obtained. In particular, the metal sheet material preferably has a strip-like long shape, and the negative electrode material slurry is applied to such a long metal sheet. It is preferable that the area to be coated is not the entire region of the long metal sheet but is a specific area to be described later so that both peripheral portions in the width direction of the metal sheet material are not coated. In a preferred aspect, it is preferable to apply the negative electrode material slurry to the same substantially long specific area to be described later so that the coated area is smaller than the long metal sheet material by one size. The negative electrode precursor (in particular, a strip-like long negative electrode precursor) to be obtained is preserved by being rolled in a roll shape or the like if necessary until to be subjected to the next step or appropriately subjected to transportation and the like. Moreover, in the next step, cutting (cutting step) is performed to obtain a plurality of negative electrodes from the negative electrode precursor (the cutting is performed after the positive electrode precursor is unrolled in the case of being wound in a roll shape). For example, cutting out of the negative electrode from the negative electrode precursor (in particular, "the portion coated with the negative electrode material slurry") is performed by subjecting the negative electrode precursor to mechanical cutting. So-called "punching operation" may be performed although it is only an example to the last. After the pressing step and before the cutting step, usually a slitting step of cutting off both end portions (uncoated portions) in the width direction of the electrode precursor containing the metal sheet material and the electrode material layer formed on the metal sheet material may be performed. In the slitting step, the uncoated region to be a tab or an uncoated region larger than the tab may be left if desired. In the slitting step, the coated portions may be cut apart from each other (for example, cut along m in FIG. 6). The slitting step may be performed between the coating step and the pressing step. A plurality of desired negative electrodes can be obtained through the operation as described above.

(Preparation of Electrolyte)

An electrolyte to be responsible for ion migration between the positive electrode and the negative electrode at the time of battery use is prepared (in particular, a non-aqueous electrolyte is prepared in the case of a lithium ion battery). Hence, raw materials to constitute such an electrolyte are mixed together to prepare a desired electrolyte (in the manufacturing method of the present invention, the electrolyte may be a conventional electrolyte to be used in a conventional secondary battery and thus those to be conventionally used in the manufacture of a secondary battery may be used as the raw materials thereof).

(Preparation of Separator)

In the manufacturing method of the present invention, the separator may be conventional one and thus those to be conventionally used as a secondary battery may be used.

A secondary battery can be obtained by integrally combining the positive electrode, negative electrode, electrolytic solution, and separator which are fabricated/prepared as described above. In particular, a plurality of positive electrodes and a plurality of negative electrodes can be stacked with the separator interposed therebetween to form an electrode assembly and the electrode assembly can be enclosed in an outer packaging body together with the electrolyte to obtain a secondary battery. Incidentally, the separator cut into sheets may be stacked or the separators may be stacked in the shape of a plate and the excess portion is cut off. Furthermore, the electrodes may be individually packaged with the separator and then stacked.

(Features of the Present Invention)

The present invention has features in the manufacture of a secondary battery as described above, particularly in the fabrication of an electrode. In detail, the method for manufacturing a secondary battery of the present invention includes a step of applying an electrode material layer-forming raw material and a step of cutting an electrode to be described below with regard to the fabrication of at least either of a positive electrode or a negative electrode. In other words, in the method for manufacturing a secondary battery of the present invention, the method for fabricating a positive electrode includes a step of applying an electrode material layer-forming raw material and a step of cutting an electrode to be described below and/or the method for fabricating a negative electrode includes a step of applying an electrode material layer-forming raw material and a step of cutting an electrode to be described below.

Step of applying electrode material layer-forming raw material

In the step of applying an electrode material layer-forming raw material, the electrode material layer-forming raw material is applied from a die head to a single metal sheet material 10 to be an electrode current collector to form an electrode material layer 20, and an electrode precursor 30 is obtained (FIG. 2, FIG. 4, FIG. 6, FIG. 8, and FIG. 10).

The entire coating shape of the electrode material layer-forming raw material on the metal sheet material 10 can be set to, for example, the following shape P according to the planned cutting shape (non-rectangular shape) of the electrode in plan view.

Shape P: As illustrated in FIG. 2, FIG. 4, FIG. 6, FIG. 8, and FIG. 10, in a rectangular shape R having a longitudinal direction parallel to a longitudinal direction g of the metal sheet material 10, a shape which intermittently has a narrow uncoated region N along the longitudinal direction g at one or both end portions or the central portion in a vertical direction w with respect to the longitudinal direction g and may intermittently have a wide uncoated region M over the overall length in the vertical direction w along the longitudinal direction g.

In the shape P, the dimension of the narrow uncoated region N in the vertical direction w is smaller than the overall length in the vertical direction w of the substantially rectangular shape R (the shape of broken line region) having a longitudinal direction parallel to the longitudinal direction g of the metal sheet material 10. The substantially rectangular shape R is the entire shape brought about by the outer edge of the entire coating shape (the entire coating region) of the electrode material layer-forming raw material on the metal sheet material 10. The narrow uncoated region N is preferably aligned along the longitudinal direction g and more preferably periodically aligned at a constant interval. The dimension of the wide uncoated region M in the vertical direction w is equal to the overall length in the vertical direction w of the substantially rectangular shape R (shape of broken line region). The shape P may or may not have the wide uncoated region M. In a case in which the shape P has the wide uncoated region M, the shape P may intermittently have the wide uncoated region M along the longitudinal direction g. It is difficult to directly define the shapes of the narrow uncoated region N and the wide uncoated region M since these are shapes of the regions which are not coated with the electrode material layer-forming raw material and are not shaped. Hence, the shapes of the narrow uncoated region N and the wide uncoated region M are shapes around the narrow uncoated region N and the wide uncoated region M and shapes to be indirectly defined by the outer periphery and the like of the substantially rectangular shape R. The shape of the narrow uncoated region N may also be a rectangular shape. The shape of the wide uncoated region M may also be a rectangular shape.

Specific examples of such a shape P include the following shapes p1 to p5.

Figure 2:
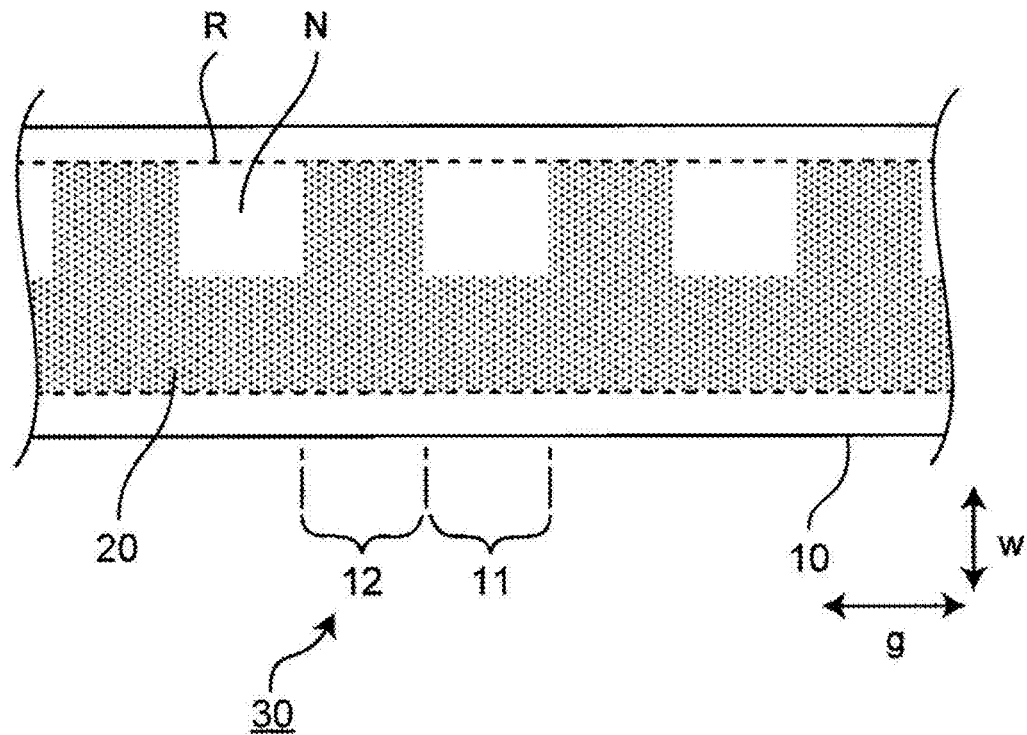
FIG. 2 is a plan view which schematically illustrates an embodiment of an electrode precursor obtained in a step of applying an electrode material layer-forming raw material in a method for manufacturing a secondary battery of the present invention.

Shape p1: As illustrated in FIG. 2, in a substantially rectangular shape R (shape of broken line region) having a longitudinal direction parallel to the longitudinal direction g of the metal sheet material 10, a shape intermittently having a narrow uncoated region N along the longitudinal direction g at one end portion in the vertical direction w with respect to the longitudinal direction g. The shape p1 does not have the wide uncoated region M.

An example of the shape p1 includes a comb-tooth shape as illustrated in FIG. 2. The comb-tooth shape is a shape in which a "narrow portion 11" and a "wide portion 12" are alternately continued in the longitudinal direction g and an increase/a decrease in the width thereof is provided only by one end portion in the vertical direction w. This shape is also called a one-sided comb-tooth shape. The width is the length of the entire coating shape in the vertical direction w with respect to the longitudinal direction g of the metal sheet material 10. The "narrow portion 11" means a local portion of the entire coating shape having a width dimension relatively decreased in plan view while the "wide portion 12" means a local portion of the entire coating shape having a width dimension relatively increased in plan view. In other words, the comb-tooth shape as the entire coating shape has a form in which the width dimension is not constant but is locally decreased or locally increased. In a preferred aspect, a plurality of such "narrow portions 11" have substantially the same shape/the same size, and in the same manner, a plurality of "wide portions 12" also have substantially the same shape/the same size. In other words, it is preferable that the entire coating shape has a width dimension which is periodically decreased or increased. Hereinafter, the "entire coating shape" mainly means the entire shape of the coating shape of the electrode material layer-forming raw material on the metal sheet material 10.

Figure 4:
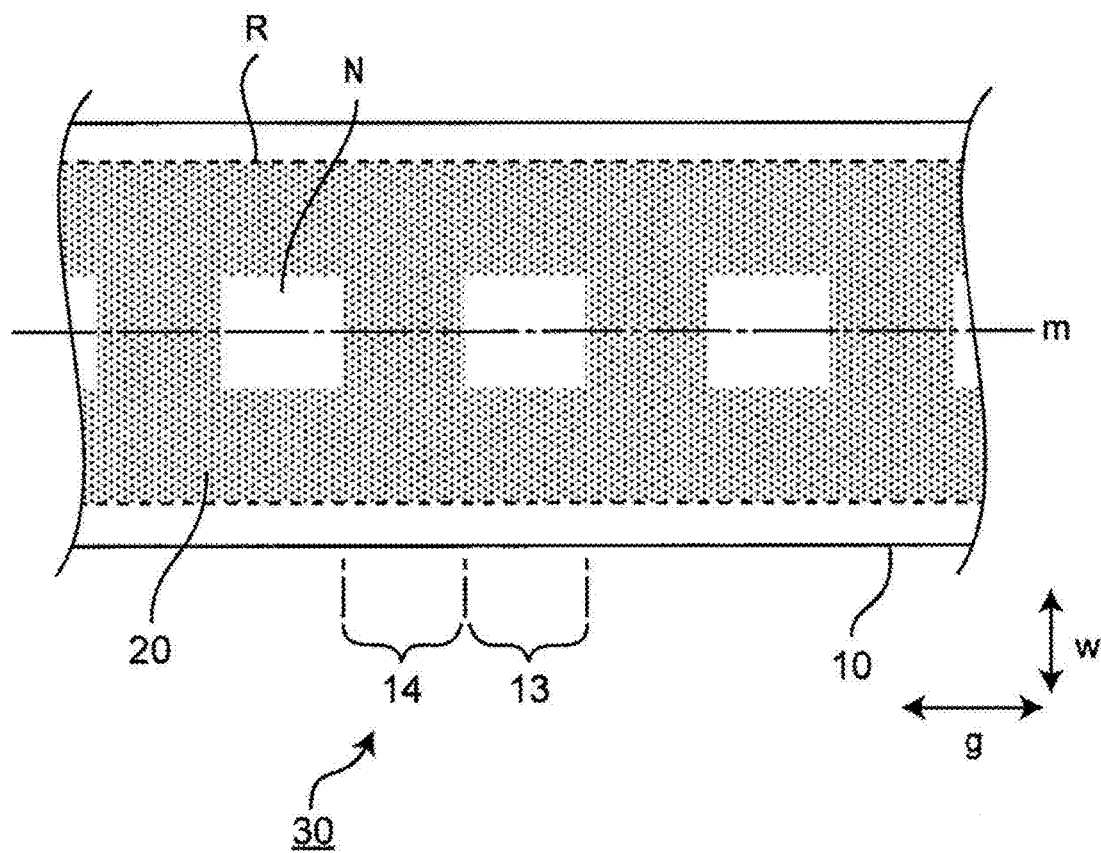
FIG. 4 is a plan view which schematically illustrates an embodiment of an electrode precursor obtained in a step of applying an electrode material layer-forming raw material in a method for manufacturing a secondary battery of the present invention.

Shape p2: As illustrated in FIG. 4, in a substantially rectangular shape R (shape of broken line region) having a longitudinal direction parallel to the longitudinal direction g of the metal sheet material 10, a shape intermittently having a narrow uncoated region N along the longitudinal direction g at the substantially central portion in the vertical direction w with respect to the longitudinal direction g. The shape p2 does not have the wide uncoated region M.

An example of the shape p2 includes a ladder shape as illustrated in FIG. 4. The ladder shape is a shape in which the width is substantially constant in the longitudinal direction g but an "uncoated region-including portion 13" and an "uncoated region-free portion 14" are alternately continued. The width is the length of the entire coating shape in the vertical direction w with respect to the longitudinal direction g of the metal sheet material 10. The "uncoated region-including portion 13" means a local portion of the entire coating shape including the narrow uncoated region N in the width direction in plan view while the "uncoated region-free portion 14" means a local portion of the entire coating shape which does not include the narrow uncoated region N in the width direction in plan view. In other words, the ladder shape as the entire coating shape has a form in which the width dimension is constant but the narrow uncoated region N is locally present or the narrow uncoated region N is not present. In a preferred aspect, a plurality of such "uncoated region-including portions 13" have substantially the same shape/the same size, and in the same manner, a plurality of "uncoated region-free portions 14" also have substantially the same shape/the same size. In other words, in the entire coating shape, it is preferable that the narrow uncoated region N is periodically present or is not present in the longitudinal direction g. In the "uncoated region-including portion 13" in FIG. 4, the narrow uncoated region N is disposed at the substantially central portion in the width direction w but the disposition thereof is not particularly limited as long as the narrow uncoated region N is not disposed at the end portion in the width direction w. It is preferable that the ladder shape has line symmetry by taking a center line m of the width dimension parallel to the longitudinal direction g as the axis.

Figure 6:
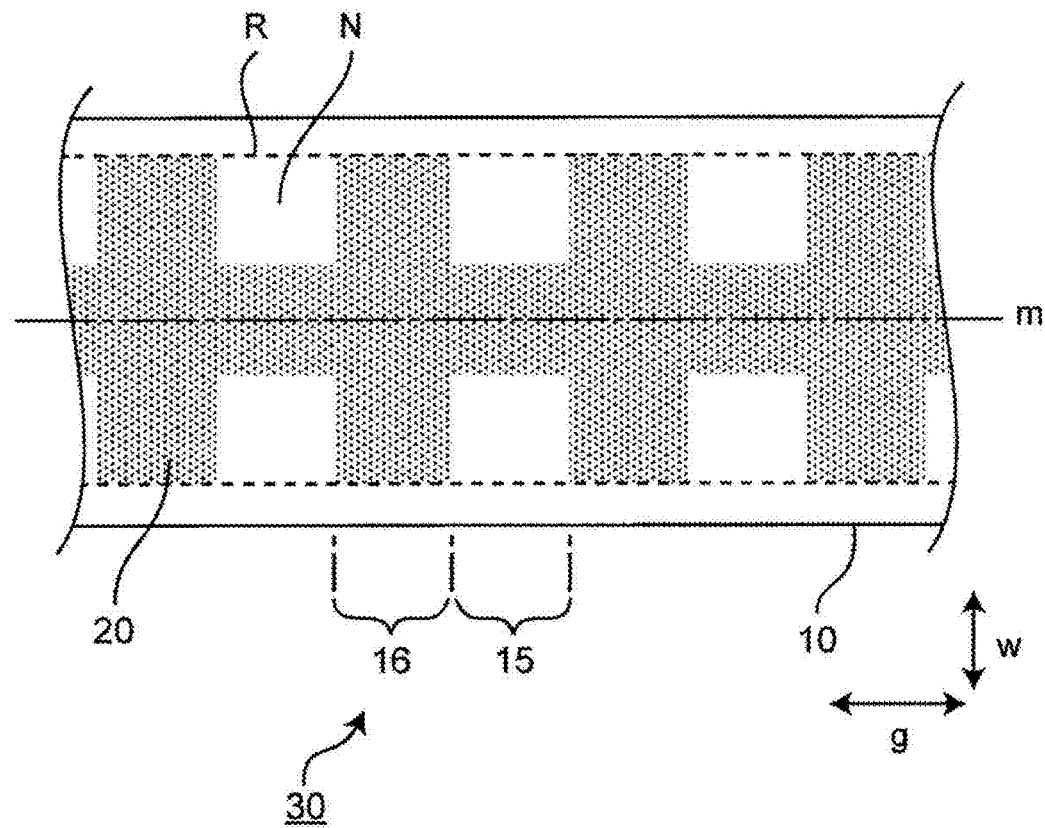
FIG. 6 is a plan view which schematically illustrates an embodiment of an electrode precursor obtained in a step of applying an electrode material layer-forming raw material in a method for manufacturing a secondary battery of the present invention.

Shape p3: As illustrated in FIG. 6, in a substantially rectangular shape R (shape of broken line region) having a longitudinal direction parallel to the longitudinal direction g of the metal sheet material 10, a shape intermittently having a narrow uncoated region N along the longitudinal direction g at both end portions in the vertical direction w with respect to the longitudinal direction g. The shape p3 does not have the wide uncoated region M.

An example of the shape p3 includes an antenna shape as illustrated in FIG. 6. The antenna shape is a shape in which a "narrow portion 15" and a "wide portion 16" are alternately continued in the longitudinal direction g and an increase/a decrease in the width thereof is provided by both end portions in the vertical direction w. This shape is also called a double-sided comb-tooth shape. The width is the length of the entire coating shape in the vertical direction w with respect to the longitudinal direction g of the metal sheet material 10. The "narrow portion 15" means a local portion of the entire coating shape having a width dimension relatively decreased in plan view while the "wide portion 16" means a local portion of the entire coating shape which has a width dimension relatively increased in plan view. In other words, the antenna shape as the entire coating shape has a form in which the width dimension is not constant but is locally decreased or locally increased. In a preferred aspect, a plurality of such "narrow portions 15" have substantially the same shape/the same size, and in the same manner, a plurality of "wide portions 16" also have substantially the same shape/the same size. In other words, it is preferable that the entire coating shape has a width dimension which is periodically decreased or increased. It is preferable that the antenna shape has line symmetry by taking a center line m of the width dimension parallel to the longitudinal direction g as the axis.

Figure 8:
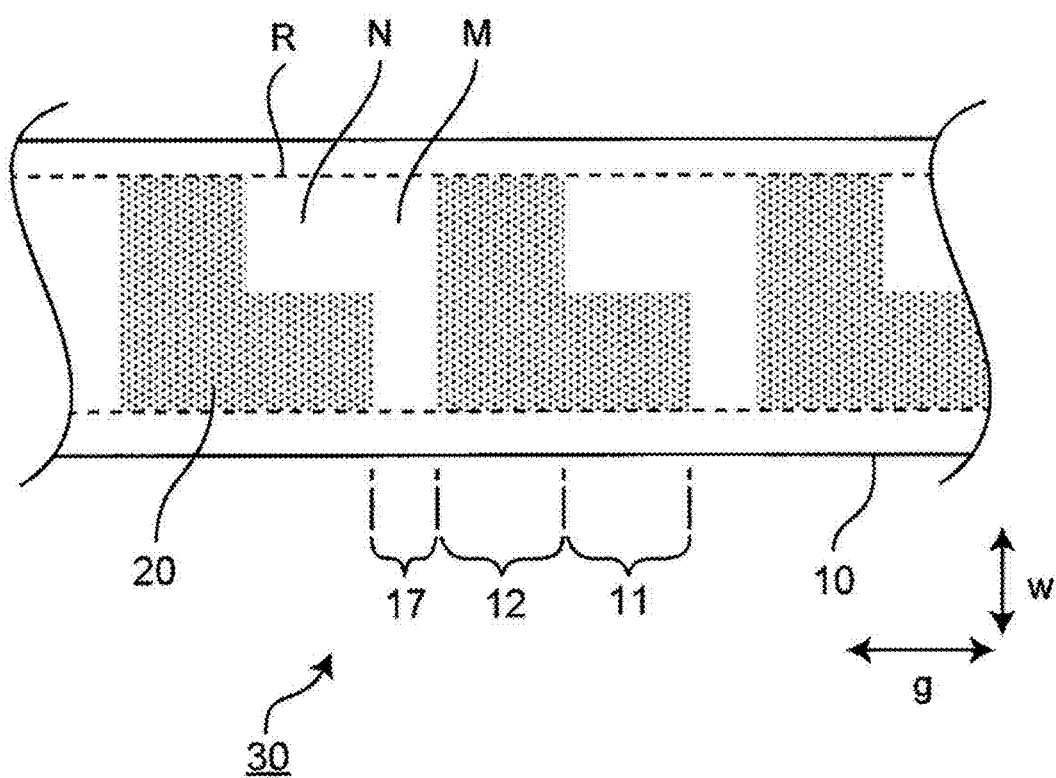
FIG. 8 is a plan view which schematically illustrates an embodiment of an electrode precursor obtained in a step of applying an electrode material layer-forming raw material in a method for manufacturing a secondary battery of the present invention.

Shape p4: As illustrated in FIG. 8, in a substantially rectangular shape R (shape of broken line region) having a longitudinal direction parallel to the longitudinal direction g of the metal sheet material 10, a shape intermittently having a wide uncoated region M along the longitudinal direction g while intermittently having a narrow uncoated region N along the longitudinal direction g at one end portion in the vertical direction w with respect to the longitudinal direction g.

An example of the shape p4 includes an independent L shape as illustrated in FIG. 8. The independent L shape is a shape in which a "narrow portion 11", a "wide portion 12", and a "wide uncoated region M(17)" are alternately continued in the longitudinal direction g and an increase/a decrease in the width thereof is provided by one end portion in the vertical direction w and the wide uncoated region M (17). The width is the length of the entire coating shape in the vertical direction w with respect to the longitudinal direction g of the metal sheet material 10. The "narrow portion 11" means a local portion of the entire coating shape having a width dimension relatively decreased in plan view while the "wide portion 12" means a local portion of the entire coating shape having a width dimension relatively increased in plan view. Moreover, the "wide uncoated region M (17)" means a local portion of the entire coating shape of which the width dimension has disappeared in plan view. In other words, the independent L shape as the entire coating shape has a form in which the width dimension is not constant but is locally decreased or locally increased. In a preferred aspect, a plurality of such "narrow portions 11" have substantially the same shape/the same size, a plurality of "wide portions 12" also have substantially the same shape/the same size in the same manner, and a plurality of "wide uncoated regions M(17)" also have substantially the same shape/the same size in the same manner. In other words, it is preferable that the entire coating shape has a width dimension which is periodically decreased or increased. Hereinafter, the "entire coating shape" mainly means the entire shape of the coating shape of the electrode material layer-forming raw material on the metal sheet material 10.

Figure 10:
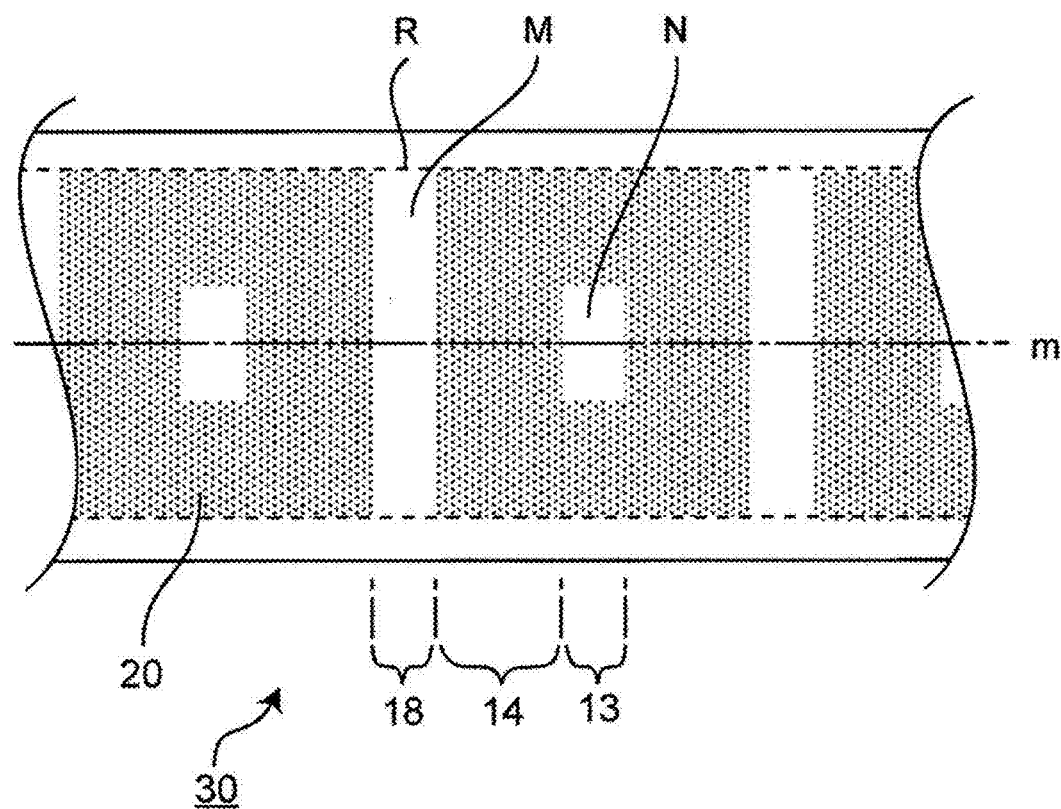
FIG. 10 is a plan view which schematically illustrates an embodiment of an electrode precursor obtained in a step of applying an electrode material layer-forming raw material in a method for manufacturing a secondary battery of the present invention.

Shape p5: As illustrated in FIG. 10, in a substantially rectangular shape R (shape of broken line region) having a longitudinal direction parallel to the longitudinal direction g of the metal sheet material 10, a shape intermittently having a wide uncoated region M along the longitudinal direction g while intermittently having a narrow uncoated region N along the longitudinal direction g at the central portion in the vertical direction w with respect to the longitudinal direction g.

An example of the shape p5 includes an independent O shape as illustrated in FIG. 10. The independent O shape is a shape in which an "uncoated region-including portion 13", an "uncoated region-free portion 14", and a "wide uncoated region M(18)" are alternately continued in the longitudinal direction g and an increase/a decrease in the width thereof is provided by the wide uncoated region M(18). The width is the length of the entire coating shape in the vertical direction w with respect to the longitudinal direction g of the metal sheet material 10. The "uncoated region-including portion 13" means a local portion of the entire coating shape including the narrow uncoated region N in the width direction in plan view while the "uncoated region-free portion 14" means a local portion of the entire coating shape which does not include the narrow uncoated region N in the width direction in plan view. Moreover, the "wide uncoated region M(18)" means a local portion of the entire coating shape of which the width dimension has disappeared in plan view. In other words, the independent O shape as the entire coating shape has a form in which the width dimension is not constant but is locally decreased or locally increased. In a preferred aspect, a plurality of such "uncoated region-including portions 13" have substantially the same shape/the same size, a plurality of "uncoated region-free portions 14" also have substantially the same shape/the same size in the same manner, and a plurality of "wide uncoated regions M(18)" also have substantially the same shape/the same size in the same manner. In other words, in the entire coating shape, it is preferable that the narrow uncoated region N and the wide uncoated region M are periodically present or are not present in the longitudinal direction g. In the "uncoated region-including portion 13" in FIG. 10, the narrow uncoated region N is disposed at the substantially central portion in the width direction w but the disposition thereof is not particularly limited as long as the narrow uncoated region N is not disposed at the end portion in the width direction w. It is preferable that the independent O shape has line symmetry by taking a center line m of the width dimension parallel to the longitudinal direction g as the axis.

Figure 5A:
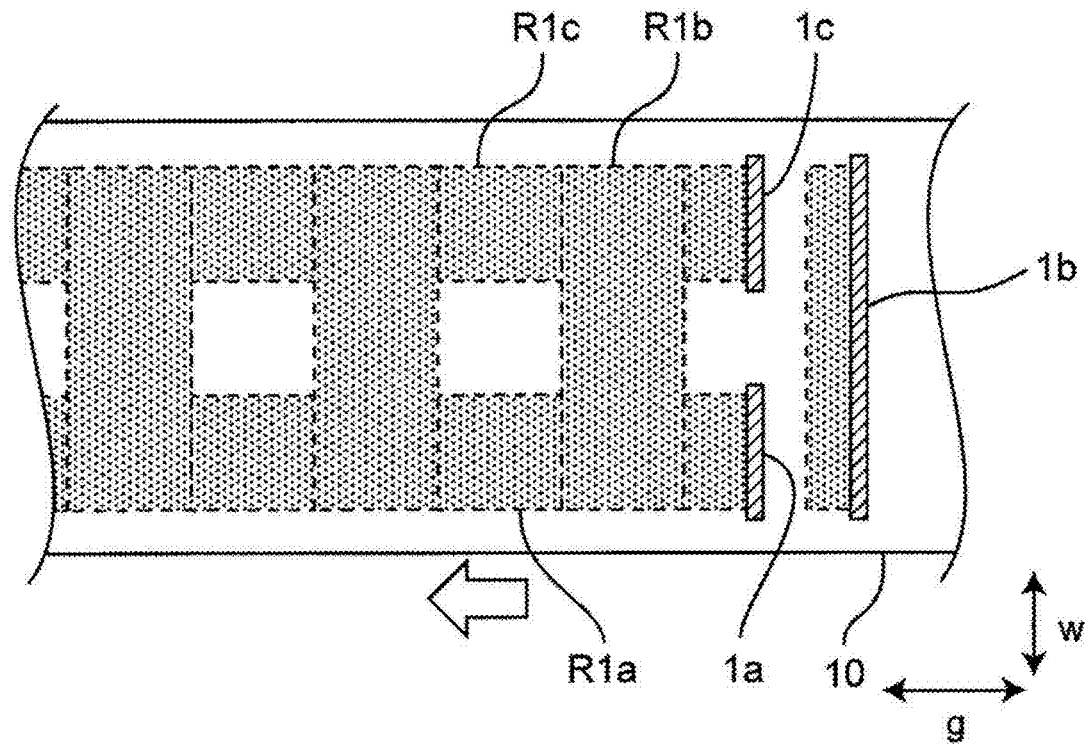
FIG. 5A is a plan view which schematically illustrates an embodiment of a step of applying an electrode material layer-forming raw material for obtaining the electrode precursor in FIG. 4.
Figure 9A:
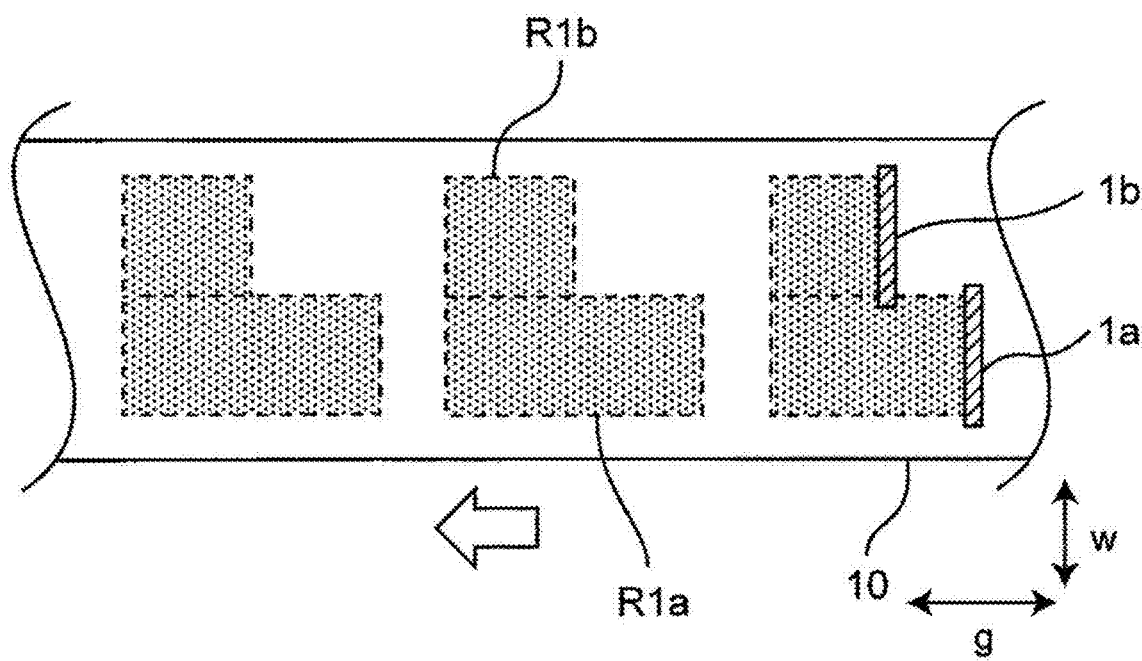
FIG. 9A is a plan view which schematically illustrates an embodiment of a step of applying an electrode material layer-forming raw material for obtaining the electrode precursor in FIG. 8.
Figure 11A:
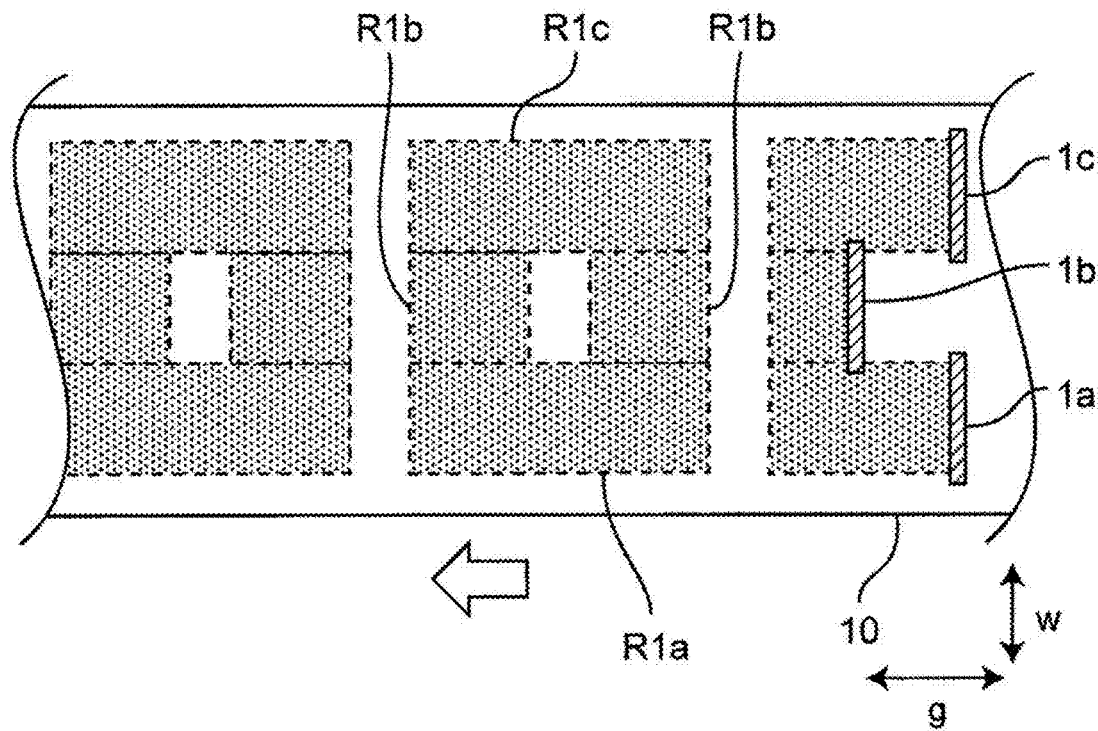
FIG. 11A is a plan view which schematically illustrates an embodiment of a step of applying an electrode material layer-forming raw material for obtaining the electrode precursor in FIG. 10.

In the present step, two or more kinds of intermittent coating are performed in combination using two or more die heads, and this makes it possible to form the entire coating shape of the electrode material layer-forming raw material. In detail, coating is performed using at least two die heads for performing two or more kinds of intermittent coating. The number of die heads in the intermittent coating method is usually 2 or more and 4 or less, particularly 2 or more and 3 or less in the case of one stripe. One stripe means one streak extending in the longitudinal direction g by taking one settlement continuing in the width direction (vertical direction) w as one unit. One stripe (streak) extending in the longitudinal direction g may be continuous or discontinuous. For example, FIG. 2, FIG. 4, and FIG. 6 each illustrate one stripe of entire coating shape and are continuing in the longitudinal direction g. In addition, for example, FIG. 8 and FIG. 10 each illustrate one stripe of entire coating shape and are discontinuing in the longitudinal direction g. The total number of die heads to be used is appropriately determined according to one stripe of entire coating shape (namely, the number of die heads required for one stripe of entire coating shape) and the width dimension (vertical direction w) of the metal sheet material (namely, the number of stripes of entire coating shape to be formed on one metal sheet material). For example, in a case in which a metal sheet material having a common width dimension (for example, 700 mm) is used and three stripes of entire coating shape are formed on the metal sheet material by the coating method as illustrated in FIG. 5A or FIG. 11A, the number of die heads for performing coating by the intermittent coating method is nine. In addition, for example, in a case in which a metal sheet material having a common width dimension (for example, 700 mm) is used and three stripes of entire coating shape are formed on the metal sheet material by the coating method as illustrated in FIG. 9A, the number of die heads for performing coating by the intermittent coating method is six. Hence, in the present invention, generally, the number of die heads for performing coating by the intermittent coating method is at least two, particularly 2 or more and 9 or less and the number of kinds of intermittent coating is two or more kinds, particularly two or more kinds and 9 or less kinds. In the present invention, two or more kinds of intermittent coating are performed in combination using such two or more die heads, and thus the range of the entire coating shape which can be formed by the electrode material layer-forming raw material on the metal sheet material 10 is expanded. As a result, it is possible to form the entire coating shape of the electrode material layer-forming raw material by which the residual portion after cutting can be diminished according to the cutting shape (non-rectangular shape) of the electrode, and thus to diminish the residual portion to be discarded after cutting. Hereinafter, an embodiment in which coating is performed by ejecting an electrode material layer-forming raw material from a fixed die head to a moving metal sheet material is explained, but coating may be performed by ejecting an electrode material layer-forming raw material from a moving die head to a fixed metal sheet material. In other words, the coating of the electrode material layer-forming raw material may be performed while relatively moving at least either of the metal sheet material or the die head in the longitudinal direction of the metal sheet material.

Figure 3:
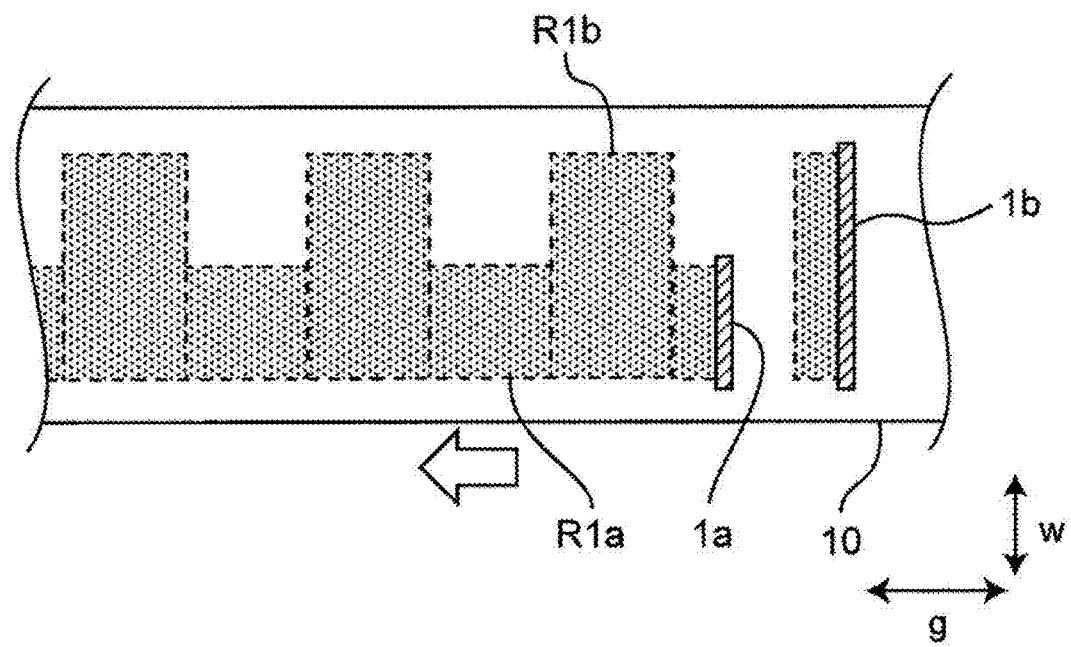
FIG. 3 is a plan view which schematically illustrates an embodiment of a step of applying an electrode material layer-forming raw material for obtaining the electrode precursor in FIG. 2.

Intermittent coating means that coating is performed intermittently or saccadically, and is to repeat the coating-stopping operation from one die head 1a (that is, the operation in which coating of the electrode material layer-forming raw material is performed and then stopped), for example, as illustrated in FIG. 3. In FIG. 3, the intermittent coating is performed from one die head 1b as well, that is, the operation in which coating of the electrode material layer-forming raw material is performed and then stopped is repeated. For example, as illustrated in FIG. 3, the coating shape and coating pitch in the coating region (R1a or R1b) are usually constant in intermittent coating using one die head (1a or 1b). The coating shape of the electrode material layer-forming raw material to be obtained on the metal sheet material 10 by intermittent coating is a plurality of rectangular shapes R1a or R1b formed at intervals in the longitudinal direction g of the metal sheet material 10. One rectangular shape R1a or R1b to be obtained by intermittent coating has a shorter length dimension in the longitudinal direction g of the metal sheet material 10 than the entire coating shape (substantially rectangular shape R (see FIG. 2)) of the electrode material layer-forming raw material on the metal sheet material 10.

The two or more kinds of intermittent coating are two or more kinds of intermittent coating providing different coating shapes and/or different coating pitches. Usually, one kind of intermittent coating is performed using one die head. In one kind of intermittent coating using one die head, the coating shape and coating pitch in the coating region are usually constant. In the present invention, two or more kinds of intermittent coating providing different coating shapes and/or different coating pitches are performed using two or more die heads. The two or more kinds of intermittent coating may be performed at different coating positions. The coating position is the disposition in the width direction (vertical direction) g. By combining such two or more kinds of intermittent coating, the coating shapes of the electrode material layer-forming raw materials from the respective die heads can be combined with each other to form a non-rectangular shape of the electrode. To be different in coating shape also includes a phenomenon that the dimensions of coating shapes are different from one another. To be different in coating pitch means that the repeated pitches in the coating region are different from one another. One coating shape to be provided by intermittent coating using one die head is usually a rectangular shape.

The entire coating shape of the electrode material layer-forming raw material illustrated in FIG. 2 can be obtained, for example, by performing coating using two die heads 1a and 1b for performing intermittent coating as illustrated in FIG. 3.

Figure 5B:
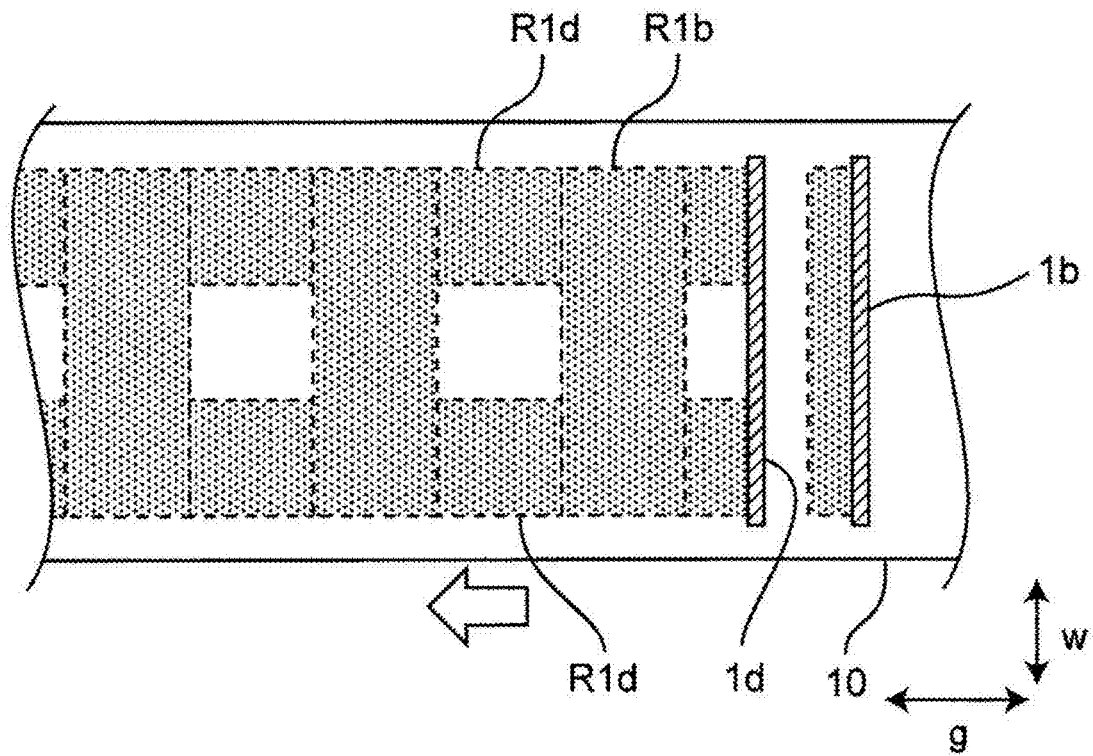
FIG. 5B is a plan view which schematically illustrates an embodiment of a step of applying an electrode material layer-forming raw material for obtaining the electrode precursor in FIG. 4.

The entire coating shape of the electrode material layer-forming raw material illustrated in FIG. 4 can be obtained, for example, by performing coating using three die heads 1a, 1b, and 1c for performing intermittent coating as illustrated in FIG. 5A. In the case of using three or more die heads 1a, 1b, and 1c and performing coating using two or more die heads 1a and 1c which are not adjacent to each other in synchronization among the three or more die heads in this manner, the die heads 1a and 1c can be integrated as one die head 1d as illustrated in FIG. 5B. The "two die heads which are not adjacent to each other" means two die heads which do not provide two coating shapes (coating regions) in contact with each other in the longitudinal direction g of the metal sheet material on the metal sheet material 10 or in the vertical direction w thereof. The integrated die head 1d usually has a shim inserted in the die head 1d. The integrated die head 1d has not only the width for the individual die heads 1a and 1c before the integration but also the width for the distance between these. The shim is a member for guiding the electrode material layer-forming raw material only to the place to which the individual die heads 1a and 1c to be integrated should guide the electrode material layer-forming raw material and does not guide the electrode material layer-forming raw material between the die head 1a and the die head 1c. The guidance and coating of the electrode material layer-forming raw material by the integrated die head 1d to the place to which the individual die heads 1a and 1c should guide the electrode material layer-forming raw material are synchronized. FIG. 5A and FIG. 5B are each a plan view which schematically illustrates an embodiment of the step of applying an electrode material layer-forming raw material for obtaining the electrode precursor in FIG. 4.

Figure 7:
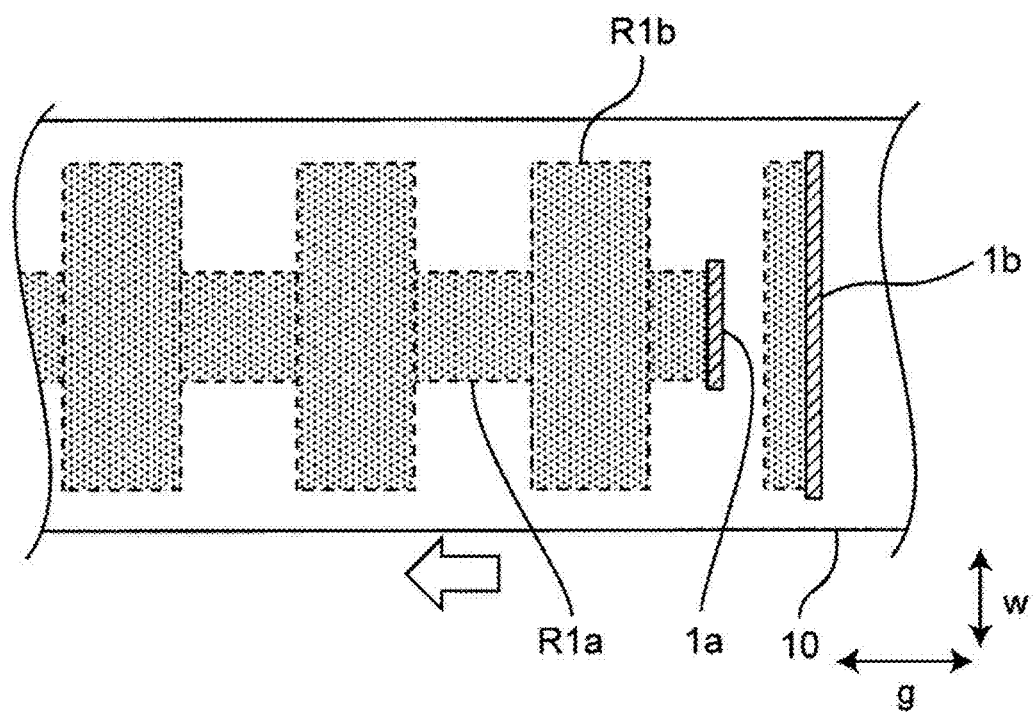
FIG. 7 is a plan view which schematically illustrates an embodiment of a step of applying an electrode material layer-forming raw material for obtaining the electrode precursor in FIG. 6.

The entire coating shape of the electrode material layer-forming raw material illustrated in FIG. 6 can be obtained, for example, by performing coating using two die heads 1a and 1b for performing intermittent coating as illustrated in FIG. 7. FIG. 7 is a plan view which schematically illustrates an embodiment of the step of applying an electrode material layer-forming raw material for obtaining the electrode precursor in FIG. 6.

Figure 9B:
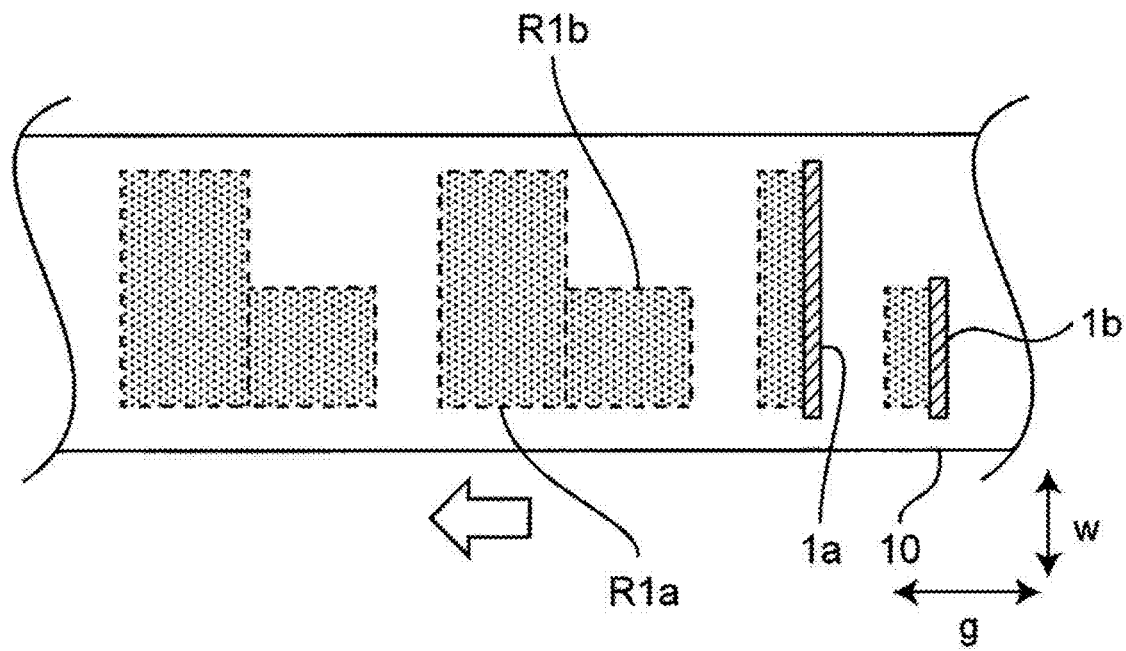
FIG. 9B is a plan view which schematically illustrates an embodiment of a step of applying an electrode material layer-forming raw material for obtaining the electrode precursor in FIG. 8.

The entire coating shape of the electrode material layer-forming raw material illustrated in FIG. 8 can be obtained, for example, by performing coating using two die heads 1a and 1b for performing intermittent coating as illustrated in FIG. 9A and FIG. 9B. FIG. 9A and FIG. 9B are each a plan view which schematically illustrates an embodiment of the step of applying an electrode material layer-forming raw material for obtaining the electrode precursor in FIG. 6.

Figure 11B:
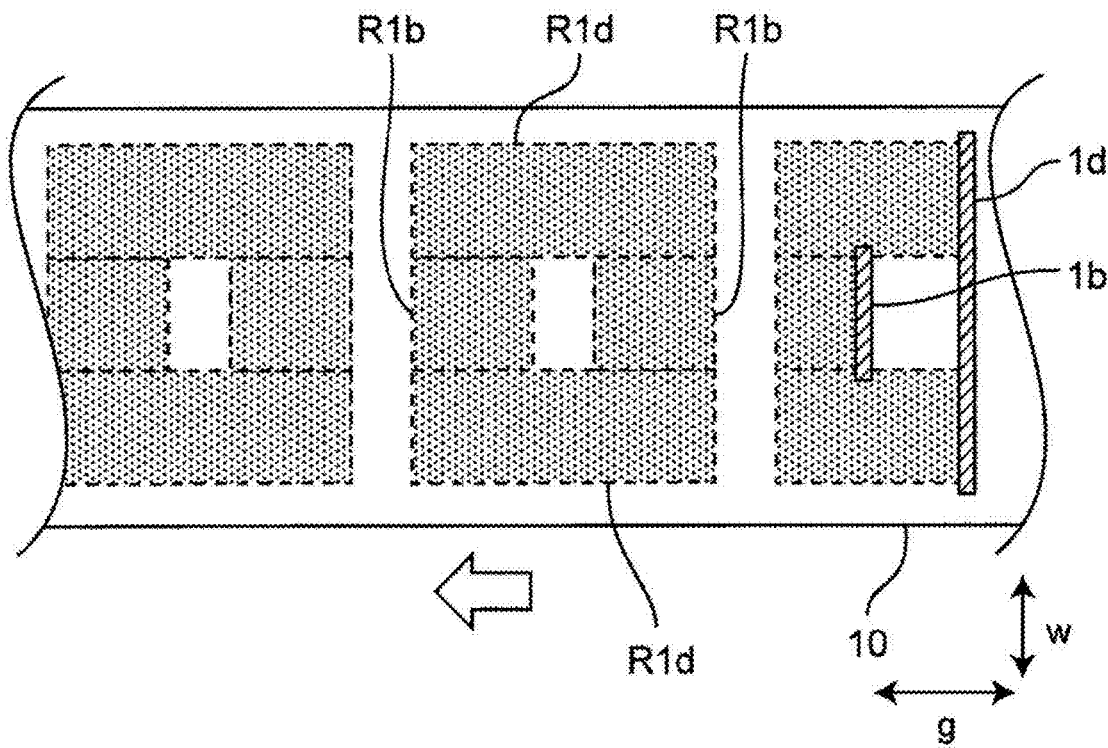
FIG. 11B is a plan view which schematically illustrates an embodiment of a step of applying an electrode material layer-forming raw material for obtaining the electrode precursor in FIG. 10.
Figure 11C:
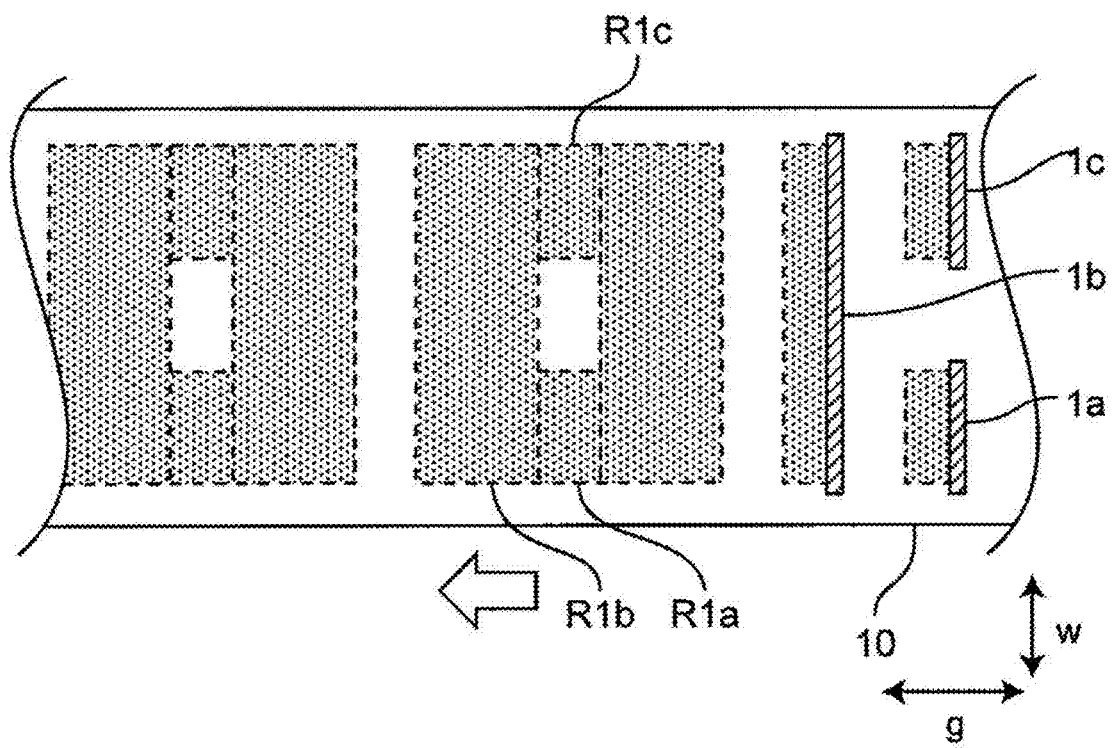
FIG. 11C is a plan view which schematically illustrates an embodiment of a step of applying an electrode material layer-forming raw material for obtaining the electrode precursor in FIG. 10.

The entire coating shape of the electrode material layer-forming raw material illustrated in FIG. 10 can be obtained, for example, by performing coating using three die heads 1a, 1b, and 1c for performing intermittent coating as illustrated in FIG. 11A and FIG. 11C. In the case of using three or more die heads 1a, 1b, and 1c and performing coating using two or more die heads 1a and 1c which are not adjacent to each other in synchronization among the three or more die heads as illustrated in FIG. 11A, the die heads 1a and 1c can be integrated as one die head 1d as illustrated in FIG. 11B. The "two die heads which are not adjacent to each other" means two die heads which do not provide two coating shapes (coating regions) in contact with each other in the longitudinal direction g of the metal sheet material on the metal sheet material 10 or in the vertical direction w thereof as described above. The integrated die head 1d usually has a shim inserted in the die head 1d. The integrated die head 1d has not only the width for the individual die heads 1a and 1c before the integration but also the width for the distance between these. The shim is a member for guiding the electrode material layer-forming raw material only to the place to which the individual die heads 1a and 1c to be integrated should guide the electrode material layer-forming raw material and does not guide the electrode material layer-forming raw material between the die head 1a and the die head 1c. The guidance and coating of the electrode material layer-forming raw material by the integrated die head 1d to the place to which the individual die heads 1a and 1c should guide the electrode material layer-forming raw material are synchronized. FIG. 11A, FIG. 11B, and FIG. 11C are each a plan view which schematically illustrates an embodiment of a step of applying an electrode material layer-forming raw material for obtaining the electrode precursor in FIG. 10.

In the present step, the electrode material layer-forming raw materials from each of two die heads adjacent to each other among all the (two or more) die heads to be used are in contact with each other on the metal sheet material 10. In other words, two die heads adjacent to each other among the two or more die heads are disposed so that the electrode material layer-forming raw materials from the respective die heads are in contact with each other on the metal sheet material 10. The "two die heads adjacent to each other" means two die heads which provide two coating shapes (coating regions) in contact with each other in the longitudinal direction g of the metal sheet material on the metal sheet material 10 or in the vertical direction w thereof. In the present invention, each of the two or more die heads to be used has such a relationship of being two die heads adjacent to each other with any other die head. For this reason, the coating shape of the electrode material layer-forming raw material from each die head can constitute a part of the cutting shape of the electrode and thus the range of the entire coating shape which can be formed by the electrode material layer-forming raw material on the metal sheet material 10 is expanded. As a result, it is possible to obtain the entire coating shape of the electrode material layer-forming raw material by which the residual portion after cutting can be diminished according to the cutting shape of the electrode and thus to diminish the residual portion to be discarded after cutting. From the viewpoint of decreasing a change in thickness in the contact portion (boundary portion of the coating region), it is preferable to perform coating so that the coating regions of the electrode material layer-forming raw material on the metal sheet material 10 are in contact with each other in the vertical direction w with respect to the longitudinal direction g of the metal sheet material 10 as illustrated in FIG. 9A, FIG. 11A, and FIG. 11B.

For example, in FIG. 9A, all the coating regions R1a derived from the die head 1a and all the coating regions R1b derived from the die head 1b are in contact with each other in the vertical direction w on the metal sheet material 10.

In addition, for example, in FIG. 11A, all the coating regions R1b derived from the die head 1b and all the coating regions R1a and R1c derived from the die heads 1a and 1c are in contact with each other in the vertical direction w on the metal sheet material 10.

Moreover, for example, in FIG. 11B, all the coating regions R1b derived from the die head 1b and all the coating regions R1d derived from the die head 1d are in contact with each other in the vertical direction w on the metal sheet material 10.

On the other hand, in FIG. 3, FIG. 5A, FIG. 5B, FIG. 7, FIG. 9B, and FIG. 11C, the coating regions derived from the respective die heads are only in contact with each other in the longitudinal direction g on the metal sheet material 10 but are not in contact with each other in the vertical direction w.

In order that the electrode material layer-forming raw materials from the respective two adjacent die heads are in contact with each other on the metal sheet material 10, it is preferable to perform one coating between the coatings by the two adjacent die heads on the upstream side of the other coating in the longitudinal direction g of the metal sheet material 10 as illustrated in FIG. 3, FIG. 5A, FIG. 5B, FIG. 7, FIG. 9A, FIG. 9B, FIG. 11A, FIG. 11B, and FIG. 11C. In other words, it is more preferable that the two adjacent die heads are disposed so that one die head is positioned on the upstream side of the other die head in the longitudinal direction g of the metal sheet material 10.

From the viewpoint of further decreasing a change in thickness in the contact portion (boundary portion) between the coating regions by the respective die heads, it is preferable to perform one coating on the upstream side of the other coating in the longitudinal direction g of the metal sheet material 10 as illustrated in FIG. 9A, FIG. 11A, and FIG. 11B particularly for coating using two die heads adjacent to each other in the vertical direction w. In other words, it is more preferable that the two die heads adjacent to each other in the vertical direction w are disposed so that one die head is positioned on the upstream side of the other die head in the longitudinal direction g of the metal sheet material 10. The "two die heads adjacent to each other in the vertical direction w" means two die heads which provide two coating shapes (coating regions) in contact with each other in the vertical direction w with respect to the longitudinal direction g of the metal sheet material on the metal sheet material 10. This is because the position of the die head for performing the other coating can be adjusted based on the coating region by one coating, as a result, the contact between the coating region by one coating and the coating region by the other coating can be sufficiently accurately achieved, and a change in thickness at the boundary between these is further decreased. For this reason, it is preferable that the two or more die heads to be used in the present step are not aligned in the vertical direction w with respect to the longitudinal direction g of the metal sheet material 10, that is, do not line up in one row.

In a case in which one coating is performed on the upstream side of the other coating as described above, it is preferable to perform one coating and the other coating by a wet-wet method. The wet-wet method is a method in which the other coating is performed without performing drying after one coating is performed between the coatings using two adjacent die heads. By the wet-wet method, the contact between the coating region by one coating and the coating region by the other coating can be more sufficiently accurately achieved and a change in thickness at the boundary between these is more sufficiently decreased. In the wet-wet method, the drying history of the electrode material layer in one electrode is the same at the portion by one coating and the portion by the other coating. In the case of employing the wet-wet method, it is more preferable to use the same one kind of slurry for electrode material layer formation as to be described later as the electrode material layer-forming raw material to be applied from all the die heads. By this, the coating portions by all the die heads become uniform in thickness, composition, and dry state in the electrode material layer in one electrode.

The electrode material layer-forming raw materials to be applied from all the die heads in the present step may be the same as one another or a part or all of the electrode material layer-forming raw materials may be different from one another, but it is preferable that the electrode material layer-forming raw materials are the same as one another. For example, one or more kinds of slurry for electrode material layer formation may be used as the electrode material layer-forming raw material to be applied from all the die heads in the present step, and preferably, one kind of slurry for electrode material layer formation is used.

The electrode material layer-forming raw material in the present step may be applied to one side or both sides of the metal sheet material 10. In the case of applying the electrode material layer-forming raw material to both sides of the metal sheet material 10, the entire coating shapes (coating patterns) obtained by the coating are usually the same on both sides. The fact that the entire coating shape obtained by coating is the same on both sides means that the entire coating shape on one side and the entire coating shape on the other side overlap each other when these entire coating shapes are seen from one side through the metal sheet material 10 with regard to the electrode precursor 30 to be obtained in the present step. In the case of applying the electrode material layer-forming raw material to both sides of the metal sheet material 10, coating of both sides may be simultaneously performed or coating of one side may be performed and then coating of the other side may be performed. In the latter case, it is preferable that coating of one side is performed, then drying is performed, and coating of the other side is performed. From the viewpoint of making the dry state of the electrode material layer uniform, it is preferable that the electrode material layer-forming raw material is simultaneously applied to both sides of the metal sheet material 10. In the case of simultaneously applying the electrode material layer-forming raw material to both sides of the metal sheet material 10, the step of applying the electrode material layer-forming raw material described above may be performed on both sides. At this time, the step of applying the electrode material layer-forming raw material described above may be performed on both sides of the metal sheet material 10 using two or more die heads symmetrically disposed to face each other across the metal sheet material 10 per one side.

After the application of the electrode material layer-forming raw material is performed in the present step, drying is usually performed before cutting of the electrode is performed. The drying method is not particularly limited and may be a heat drying method or a natural drying method.

Step of Cutting Electrode

In the step of cutting an electrode, a plurality of electrodes are cut from the electrode precursor 30 obtained in the coating step described above. The cutting method is not particularly limited as long as an electrode having a desired shape is obtained and may be, for example, a punching operation method. The cutting shape of each of the plurality of electrodes is usually a non-rectangular shape. In other words, cutting is performed so as to obtain a plurality of non-rectangular electrodes.

A "non-rectangular shape" includes shapes other than rectangular shapes such as a square and an oblong as described above, but specific examples thereof include an L shape, a T shape, an O shape, a C shape (including a U shape), an H shape (including an I shape), a cross shape, and any composite shape thereof. If electrodes having these letter shapes as a non-rectangular shape can be efficiently cut, it can be considered that an electrode having any non-rectangular shape known in the field of the plan view shape of secondary battery can be efficiently cut by the combination of these letter shapes.

For example, an electrode 40 having an L shape and a T shape in plan view as illustrated n FIG. 12A and FIG. 12B can be cut out from the electrode precursor 30 in which the entire coating shape of the electrode material layer-forming raw material is a comb-tooth shape (one-sided comb-tooth shape) as illustrated in FIG. 2.

In addition, for example, an electrode 40 having an O shape, a C shape, and an H shape in plan view as illustrated n FIG. 13A, FIG. 13B, and FIG. 13C can be cut out from the electrode precursor 30 in which the entire coating shape of the electrode material layer-forming raw material is a ladder shape as illustrated in FIG. 4.

In addition, for example, an electrode 40 having a cross shape in plan view as illustrated n FIG. 14 can be cut out from the electrode precursor 30 in which the entire coating shape of the electrode material layer-forming raw material is an antenna shape (double-sided comb-tooth shape) as illustrated in FIG. 6.

In addition, for example, an electrode 40 having an L shape in plan view as illustrated n FIG. 15 can be cut out from the electrode precursor 30 in which the entire coating shape of the electrode material layer-forming raw material is an independent L shape as illustrated in FIG. 8.

In addition, for example, an electrode 40 having an O shape in plan view as illustrated n FIG. 16 can be cut out from the electrode precursor 30 in which the entire coating shape of the electrode material layer-forming raw material is an independent O shape as illustrated in FIG. 10.

In the present step, a plurality of electrodes are usually cut out so that the coating shape of the electrode material layer-forming raw material from each of two or more die heads in the coating step described above on the metal sheet material 10 constitute the cutting shape of the electrode by being combined with each other in plan view as illustrated in FIG. 12A, FIG. 12B, FIG. 13A, FIG. 13B, FIG. 13C, and FIG. 14 to FIG. 16. Conventionally, in the case of using two or more die heads, the coating shapes by the two or more die heads are separated by the slit 560 for each die head as illustrated in FIG. 19C and FIG. 19D. For this reason, the whole of cutting shapes is provided for the coating shape by each die head, and as a result, the amount of residual portion (particularly, the residual portion of the electrode material layer material) 550 to be discarded after cutting is relatively great. In the present invention, the coating shape by each die head constitutes a part of the cutting shape and thus the cutting shape of the electrode is first formed as the coating shapes of the electrode material layer-forming raw materials from the respective two or more die heads are combined together as illustrated in FIG. 12A, FIG. 12B, FIG. 13A, FIG. 13B, FIG. 13C, and FIG. 14 to FIG. 16. For this reason, it is possible to more sufficiently diminish the residual portion (particularly, the residual portion of the electrode material layer material) to be discarded after cutting. In FIG. 12A, FIG. 12B, FIG. 13A, FIG. 13B, FIG. 13C, and FIG. 14 to FIG. 16, the broken lines indicate the cutting lines.

Preferably, the cutting shape of each of the plurality of electrodes is set to be the same as each other. In other words, the electrode precursor is cut out so that a plurality of the same "non-rectangular shapes" (40) are obtained. In the case of fabricating a positive electrode, the positive electrode precursor is cut so that the cutting shapes of a plurality of positive electrodes are non-rectangular shapes the same as each other. In the case of fabricating a negative electrode, the negative electrode precursor is cut so that the cutting shapes of a plurality of negative electrodes are non-rectangular shapes the same as each other. By such cutting, a plurality of electrodes (positive electrode/negative electrode) can be suitably used in the manufacture of the same secondary battery. Incidentally, the shape of positive electrode and the shape of negative electrode are not necessarily required to be the same as each other but are preferably substantially the same shape or approximately the same shape as each other (typically, the size of negative electrode is generally slightly larger than that of positive electrode in the case of a positive electrode and a negative electrode which are incorporated in a secondary battery, and it is thus preferable that the shape of positive electrode and the shape of negative electrode are shapes similar to each other in plan view) in the case of using the positive electrode and the negative electrode in the manufacture of the same secondary battery.

Figure 17:
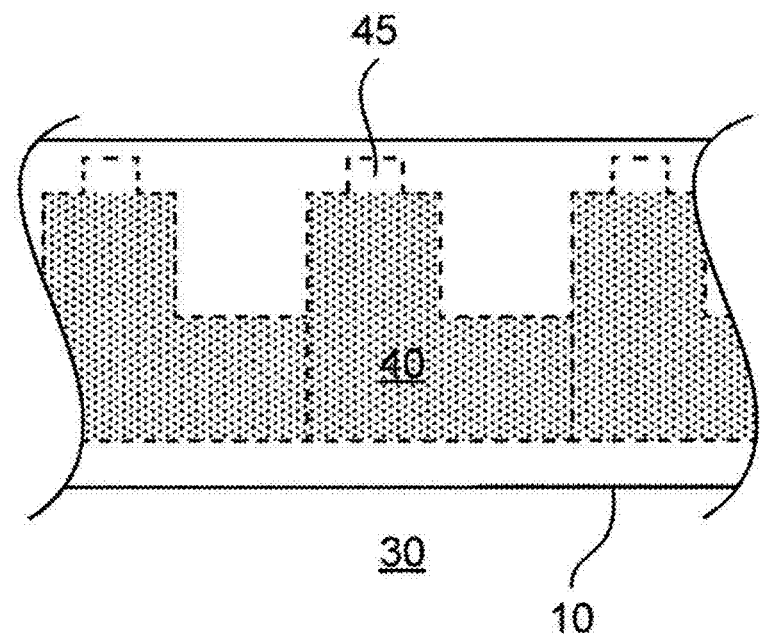
FIG. 17 is a plan view which schematically illustrates an embodiment of a step of cutting an electrode using the electrode precursor obtained in FIG. 2.

In a preferred aspect, it is preferable that each of a plurality of electrodes is cut so as to include the current collector tab portion. Specifically, it is thus preferable that cutting is performed so that the region of the metal sheet material 10 in which the electrode material layer is not provided is included in the cutting shape and thus a current collector tab 45 is provided to each of a plurality of electrodes 40 as illustrated in FIG. 17. In such a case, it is preferable to position the current collector tab portion particularly among a plurality of electrodes at the same place in the cutting shape. In other words, in the case of fabricating a positive electrode, it is preferable to position the current collector tab portion of positive electrode (so-called "positive electrode tab") among a plurality of positive electrodes at the same place in the cutting shape. In the case of fabricating a negative electrode, it is preferable to position the current collector tab portion of negative electrode (so-called "negative electrode tab") among a plurality of negative electrodes at the same place in the cutting shape. For example, in the aspect illustrated in FIG. 17, cutting is performed so that the current collector tab 45 is positioned on the same side of each non-rectangular shape among the plurality of electrodes 40. Particularly in the aspect illustrated, a "region of the metal sheet material 10 in which the electrode material layer 20 is not provided" is present at both peripheral portions in the width direction of the metal sheet material 10, and it is thus preferable that cutting is performed in a form in which the current collector tab portion 45 protrudes in the short direction of the metal sheet material 10 (namely, the short direction of the electrode precursor 30). In FIG. 17, the broken lines indicate the cutting lines.

By such cutting including the "region of the metal sheet material 10 in which the electrode material layer 20 is not provided", efficient electrode cutting can be performed by also taking the current collector tab portion into consideration and thus the efficiency of electrode fabrication can be further enhanced.

Other Steps

The method for manufacturing a secondary battery of the present invention may include a pressing step and a slitting step between the step of applying an electrode material layer-forming raw material and the step of cutting an electrode.

The pressing step is a step of adjusting the thickness of the electrode material layer in the electrode precursor, and for example, rolling is performed using a roll press.

The slitting step is a step of cutting off both ends (uncoated portions) in the width direction of the electrode precursor, and for example, a cutting machine (slitter) is used. In the slitting step, as described above, the uncoated region to be a tab or an uncoated region larger than the tab may be left if desired. In the slitting step, the coated portions may be cut apart from each other (for example, cut along m in FIG. 6).

With regard to the order in which the pressing step and the slitting step are performed, usually the slitting step is performed after the pressing step has been performed but the steps may be performed in a reverse order.

The embodiments of the present invention have been described above, but typical examples have been merely illustrated to the last. Accordingly, those skilled in the art will readily understand that the present invention is not limited thereto and various aspects are conceivable.

A secondary battery obtained by the manufacturing method of the present invention can be utilized in various fields in which storage of electricity is assumed. The secondary battery can be utilized in the fields of electricity, information, and communications in which mobile devices and the like are used (for example, the field of mobile devices such as mobile phones, smart watches, smartphones, laptop computers, digital cameras, activity meters, arm computers, and electronic papers), home/small industrial applications (for example, fields of electric power tools, golf carts, and home/care/industrial robots), large industrial applications (for example, fields of forklifts, elevators, and harbor cranes), transportation systems (for example, fields of hybrid vehicles, electric vehicles, buses, electric trains, electric assist bicycles, and two-wheeled electric vehicles), electric power system applications (for example, fields of various kinds of electric power generation, load conditioners, smart grids, and general household stationary storage systems), the IoT field, and space/deep sea applications (for example, fields of space probes and diving survey vessels).

DESCRIPTION OF REFERENCE SYMBOLS

1, 1*a*, 1*b*, 1*c*, 1*d*: Die head for intermittent coating
10: Metal sheet material
20: Electrode material layer
30: Electrode precursor
40: Electrode ("non-rectangular shape") to be cut
45: Current collector tab portion

The invention claimed is:

1. A method for manufacturing a secondary battery, the method comprising:
fabricating at least either of a positive electrode or a negative electrode by:
performing two or more kinds of intermittent coating in combination using two or more die heads that each respectively apply an electrode material layer-forming raw material directly to a surface of a metal sheet material to obtain an electrode precursor, and where at least two of the two or more die heads apply a different shape of the electrode material layer-forming raw material directly to the surface of the metal sheet material; and cutting the electrode precursor to form a plurality of electrodes.

2. The method according to claim 1, wherein the electrode material layer-forming raw material from two die heads adjacent to each other among the two or more die heads contact each other on the surface of the metal sheet material.

3. The method according to claim 1, wherein coating shapes of the electrode material layer-forming raw material from the respective two or more die heads on the surface of the metal sheet material are combined with each other and constitute a cutting shape of each of the plurality of electrodes.

4. The method according to claim 1, wherein
coating of the electrode material layer-forming raw material is performed while relatively moving the metal sheet material and the two or more die heads in a longitudinal direction of the metal sheet material, and
a first coating between coatings by two die heads adjacent to each other of the two or more die heads is performed on an upstream side of a second coating in a longitudinal direction of the metal sheet material.

5. The method according to claim 4, wherein the first coating and the second coating are performed by a wet-wet method.

6. The method according to claim 1, wherein a cutting shape of each of the plurality of electrodes is a non-rectangular shape.

7. The method according to claim 6, wherein a cutting shape of each of the plurality of electrodes is a same as each other.

8. The method according to claim 1, wherein a cutting shape of each of the plurality of electrodes is a same as each other.

9. The method according to claim 1, wherein an overall coating shape of the electrode material layer-forming raw material on the surface of the metal sheet material is, in a plan view of the secondary battery, in a shape having a longitudinal direction parallel to a longitudinal direction of the metal sheet material, which intermittently has an uncoated region along the longitudinal direction at one or both end portions or a central portion thereof in a direction perpendicular to the longitudinal direction.

10. The method according to claim 9, wherein the overall coating shape of the electrode material layer-forming raw material on the surface of the metal sheet material further has an uncoated region over an overall length in the perpendicular direction along the longitudinal direction.

11. The method according to claim 1, wherein one kind of slurry for electrode material layer formation is used as the electrode material layer-forming raw material.

12. The method according to claim 1, wherein the electrode material layer-forming raw material is applied to only one side of the metal sheet material.

13. The method according to claim 1, wherein
the electrode material layer-forming raw material is applied to opposed sides of the metal sheet material, and
coating patterns obtained thereby are a same as each other on the opposed sides.

14. The method according to claim 1, wherein the positive electrode and the negative electrode have a layer capable of storing and releasing a lithium ion.

* * * * *